(12) United States Patent
Hoyle

(10) Patent No.: US 9,096,146 B2
(45) Date of Patent: Aug. 4, 2015

(54) VEHICLE SEAT

(75) Inventor: James Brooks Hoyle, Telford (GB)

(73) Assignee: BAE SYSTEMS plc, London (GB)

( * ) Notice: Subject to any disclaimer, the term of this patent is extended or adjusted under 35 U.S.C. 154(b) by 142 days.

(21) Appl. No.: 13/880,351

(22) PCT Filed: Oct. 13, 2011

(86) PCT No.: PCT/EP2011/067865
§ 371 (c)(1), (2), (4) Date: Apr. 18, 2013

(87) PCT Pub. No.: WO2012/052346
PCT Pub. Date: Apr. 26, 2012

(65) Prior Publication Data
US 2013/0207429 A1      Aug. 15, 2013

(30) Foreign Application Priority Data

Oct. 19, 2010   (EP) .................................... 10251824
Oct. 19, 2010   (GB) .................................. 1017636.0

(51) Int. Cl.
*B60N 2/02* (2006.01)
*B60N 2/20* (2006.01)
(Continued)

(52) U.S. Cl.
CPC .. *B60N 2/02* (2013.01); *B60N 2/20* (2013.01); *B60N 2/32* (2013.01); *B60N 2002/247* (2013.01); *B60N 2205/30* (2013.01)

(58) Field of Classification Search
CPC ............... B60N 2/04; B60N 2/02; B60N 2/16
USPC ........................ 297/14, 114, 408, 403, 216.12
See application file for complete search history.

(56) References Cited

U.S. PATENT DOCUMENTS 3,442,552 A    5/1969   Lehner
3,480,324 A   11/1969   Bauer et al.
(Continued)

FOREIGN PATENT DOCUMENTS

CN   201432596        3/2010
DE   19701387 A1      7/1998
(Continued)

OTHER PUBLICATIONS

International Search Report (PCT/ISA/210) issued on Dec. 19, 2011, by the European Patent Office as the International Searching Authority for International Application No. PCT/EP2011/067865.
(Continued)

*Primary Examiner* — David R Dunn
*Assistant Examiner* — Jody Giacoman
(74) *Attorney, Agent, or Firm* — Finch & Maloney PLLC

(57) ABSTRACT

A seat for a vehicle is configured such that an occupant can be seated in either a lower position or in an upper position. The seat includes a base member for accommodating an occupant in the lower position and a seat back, positioned to extend generally upwards from the region of the base member. The seat back is configured to accommodate an occupant's back. A selectively deployable perch member is also provided. In a first condition, the perch member is configured as an extension of the seat back for when the occupant is seated in the lower position. In a second condition, the perch member is configured as an additional base member for supporting an occupant in the upper position.

30 Claims, 17 Drawing Sheets

(51) Int. Cl.
    *B60N 2/32*     (2006.01)
    *B60N 2/24*     (2006.01)

(56) References Cited

U.S. PATENT DOCUMENTS

| | | | |
|---|---|---|---|
| 4,632,457 | A | 12/1986 | Hofrichter et al. |
| 5,273,240 | A * | 12/1993 | Sharon ............... 244/122 R |
| 2,758,859 | A | 2/1998 | Gonzalez |
| 6,270,161 | B1 * | 8/2001 | De Filippo ............... 297/410 |
| 6,655,738 | B2 | 12/2003 | Kammerer |
| 7,300,107 | B2 | 11/2007 | Kammerer |
| 7,413,247 | B2 * | 8/2008 | Van Druff et al. ....... 297/216.17 |
| 7,744,155 | B2 * | 6/2010 | List et al. ............... 297/216.17 |
| 7,914,078 | B2 | 3/2011 | Hentges |
| 8,226,170 | B2 * | 7/2012 | Lutzka et al. ............ 297/408 |
| 8,801,103 | B2 * | 8/2014 | Bittinger et al. .......... 297/391 |
| 2005/0116516 | A1 | 6/2005 | Robinson |
| 2007/0029854 | A1 | 2/2007 | Robinson |
| 2007/0035167 | A1 | 2/2007 | Meyer |
| 2007/0228795 | A1 * | 10/2007 | Boehme et al. ........... 297/354.1 |
| 2010/0102609 | A1 | 4/2010 | Confer et al. |
| 2010/0230989 | A1 | 9/2010 | Cantor et al. |
| 2011/0037300 | A1 | 2/2011 | Pettigrew et al. |
| 2012/0001461 | A1 * | 1/2012 | Alexander et al. ....... 297/216.12 |
| 2013/0200676 | A1 | 8/2013 | Hoyle |
| 2013/0270877 | A1 | 10/2013 | Hoyle |

FOREIGN PATENT DOCUMENTS

| | | |
|---|---|---|
| EP | 1 361 104 A1 | 11/2003 |
| EP | 1 530 930 A1 | 5/2005 |
| FR | 2898554 A1 | 9/2007 |
| FR | 2 927 026 A1 | 8/2009 |
| FR | 2929179 A1 | 10/2009 |
| GB | 2120931 A | 12/1983 |
| GB | 2449451 A | 11/2008 |
| JP | 20100006210 A | 1/2010 |
| WO | 2009070884 A1 | 6/2009 |

OTHER PUBLICATIONS

Written Opinion (PCT/ISA/237) issued on Dec. 19, 2011, by the European Patent Office as the International Searching Authority for International Application No. PCT/EP2011/067865.
European Search Report for EP 10251824 dated Mar. 3, 2011.
United Kingdom Search Report for GB 1017636.0 dated Jan. 21, 2011.
Notification Concerning Transmittal of International Preliminary Report on Patentability (Forms PCT/IB/326 and PCT/IB/373) and the Written Opinion of the International Searching Authority (Form PCT/ISA/237) issued on May 2, 2013, in the corresponding International Application No. PCT/EP2011/067865. (6 pages).
International Preliminary Report on Patentability issued in PCT Application No. PCT/EP2011/067861, dated Apr. 23, 2013, 6 pages.
International Search Report received in PCT Application No. PCT/EP2011/067861, dated Mar. 1, 2012, 2 pages.
European Search Report received in European Application No. 102518255 dated Jun. 30, 2011, 5 pages.
United Kingdom Search Report received in Great Britain Patent Application No. 10176220, dated Jan. 20, 2011, 1 page.
International Report on Patentability and Written Opinion received in PCT Application No. PCT/EP2011/067863, dated Apr. 23, 2013, 7 pages.
International Search Report received in PCT Application No. PCT/EP2011/067863, dated Mar. 1, 2012, 3 pages.
European Search Report received in European Patent Application No. 102518156, dated Sep. 6, 2011, 3 pages.
Great Britain Search Report received in Great Britain Patent Application No. 10176790, dated Jan. 26, 2011. 3 pages.

* cited by examiner

6

VEHICLE SEAT

The present invention relates to a seat for a vehicle and in particular, but not exclusively to a seat for a turret of a vehicle.

Vehicle seats are generally provided with a generally horizontal base member (that is to say when the vehicle rests on a horizontal plane the seat member is generally horizontal) for supporting the weight of an occupant. These base members may be referred to as seat pans. Such base members may be adjustable in height or other position so as to give the occupant an improved view of the road or improved access to the relevant controls. Such adjustments will be relatively fine, perhaps ranging over approximately 200 mm.

If an occupant wishes to dramatically alter their view of their environment, it may be necessary to stand on the base member.

This situation occurs in vehicles having turrets, such as main battle tanks, where the vehicle commander may wish to open the trap door of the turret, stand on his seat and directly observe the surrounding environment. Were the commander to remain seated in the turret, the view of the surroundings may only be provided by a combination of periscopes and electronic displays.

However, there may be occasions where it is not suitable to stand on the seat.

According the present invention there is provided a seat for a vehicle, configurable to enable an occupant to be seated either in a lower position or in an upper position, the seat comprising:

a base member for accommodating an occupant in the lower position;

a seat back positioned to extend generally upwards from the region of the base member and being for accommodating an occupant's back;

a perch member selectively deployable either
  in a first condition, where the perch member is configured as an extension of the seat back for when the occupant is seated in the lower position, or
  in a second condition, where the perch member is configured as an additional base member for accommodating an occupant in the upper position; and a fastening for securing the perch member when in the second condition.

Such a provision enables the occupant to change seating height without having to move the entire seat, the entire seat back or the base member; the change can be effected by reconfiguring only the perch member.

Thus a difference to the view provided by the seat can be provided with a simplified rearrangement of the seat. This simplification may tend to expend less time and energy in effecting the transition between conditions, as compared with prior solutions.

Further, such significant alteration of the occupant's sitting position allows the occupant to vary their view of the environment. Where the seat is provided in the cab of an armoured vehicle with a roof hatch, this can permit the occupant to have a low position where the entire occupant is within the bounds of the vehicle cab, but can in the high position permit the occupant to sit with their eyes above the level of the hatch. In the high position the occupant is hence able to view the environment directly.

In many situations, the high position will be such that the head and shoulders of the occupant are above the level of the hatch and thus protrude from the vehicle cab. This arrangement can give the occupant an even better view of the surrounding environment.

The seat back may comprise a back member and a back frame. Further, the seat may comprise a pivot joint, connecting the perch member to the seat back and being configured to support the perch member and to guide the perch member. Thus the perch member may be deployed reliably and repeatably. The pivot joint may, in particular, be in the form of a hinge or may be in the form of a one or more pin joints connecting the perch member to the seat back at one or more points. In use, the axis of the pivot joint will tend to be generally horizontal when the seat is mounted on a horizontal plane. As such, when the perch member is configured into the second condition, the platform formed by the perch member can also be horizontal or at least avoid sloping laterally relative to the occupant.

The pivot joint may connect the perch member to the seat back along an axis that is positioned substantially towards an uppermost portion of the perch member. In referring to the uppermost portion, it is to be understood that this refers to the portion that tends to be disposed furthest from the base member.

Such provision causes the perch member, when in the second condition, to tend to fall back down to the first condition. The centre of gravity of the perch member may tend to be below the pivot axis when the perch member is arranged in the first condition.

The perch member may be selectively secured, using the fastening, to prevent such a falling back. However, if that fastening ceases to be applied then the perch will flip down and the occupant will drop down onto the base member. This function may be useful where the occupant requires to rapidly effect a lowering in height e.g. to retract their head within an armoured vehicle in a suddenly hostile environment.

The perch member may comprise an occupant accommodating face, and the pivot joint may be configured such that when the perch member is in the first condition, the face may accommodate the back of the occupant and when the perch member is in the second condition the face may accommodate the occupant in the upper position.

The occupant will tend to sit on the face in the second condition and so the face can be adapted so be suitable for this purpose. For example a layer of foamed material could be provided at the face to act as a cushion.

Moreover, by providing that the face can either accommodate the shoulders or act as a seat, it obviates the need to provide one face for each function.

The pivot joint may connect the perch member to the seat back along an axis that is positioned substantially towards an uppermost portion of the occupant accommodating face. In some embodiments of the invention, the pivot joint may not be disposed towards the top edge of the perch member. For example the pivot joint may be located just above the centre of the perch member so that as the perch member deploys into the second condition, one half, in particular the lower half, of the perch member forms the face for accommodating the occupant and the other half, in particular the upper half, may rotate into a latch. Whilst such an arrangement would require a recess immediately behind the top half of the perch in the first condition, it could offer a substantial anchor to effect the latch.

The perch member may comprise a linkage extending between the seat back and a point on the perch member substantially towards a lowermost end of the perch member, the linkage may be arranged to lock when the perch member is configured into the second condition such that it acts as a strut supporting the weight of an occupant. Thus the linkage may support the perch member when in the second condition. By providing the connection between the perch member and the linkage at the lowermost end of the perch member, i.e. the end furthest from the pivot joint, the reaction to the occupant weight can tend to be evenly distributed between the pivot joint and the linkage-to-perch member pivot.

The fastening may comprise a latch mechanism formed by a pin on the linkage and a gate at the seat back, such that as the perch member is configured for the second condition, the pin engages the gate and is locked in place. The perch member can therefore become secured automatically as it undergoes a rotation from the first condition to the second condition. It may not be necessary to perform further tasks to secure the perch member in the second condition and so user-friendliness is improved.

The seat may be provided with a switch, readily accessible by the occupant when in the upper position, the switch communicating with the perch member such that upon actuation of the switch the perch member ceases to be secured by the fastening. If the perch member is fastened by way of a pin and gate latch system, the switch may communicate with the gate so that actuation of the switch causes the pin to be released from the gate.

Thus is provided a quick way of reconfiguring the perch member from the second condition to the first. Such a quick reconfiguration capability may assist where the occupant is suddenly introduced to a hostile environment, or suddenly comes under fire.

The seat may be provided with a second fastening for securing the perch member in the first condition. By providing such a fastening, any tendency for the perch to deploy into the second condition can be resisted. One scenario where the perch would tend to deploy would be where the perch is used on a braking vehicle, where the perch might otherwise tend to deploy as a result of its inertia.

The seat may be provided with a linkage and the second fastening may be formed by a pivoted cam hanging off the seat back such that if the pivoted cam is held in a forward position then the cam obstructs the linkage and prevents deployment of the perch member into second condition and if the pivoted cam is held in a backwards position then the linkage is free to extend and thus deploy the perch. This can tend to provide an easy to maintain mechanism for selectively securing the perch in the first condition. The pivoted cam may be pivoted about the same axis as the pivot joint but may pivot independently.

The seat may comprise a first occupant restraint for restraining the occupant whilst in the lower position and a second occupant restraint for restraining the occupant in the upper position. Such occupant restraints may be in the form of a two, three or four point seat belt.

So that the invention may be more clearly understood, at least one embodiment of the invention shall now be described with reference to the following figures of which:

Figure 17:
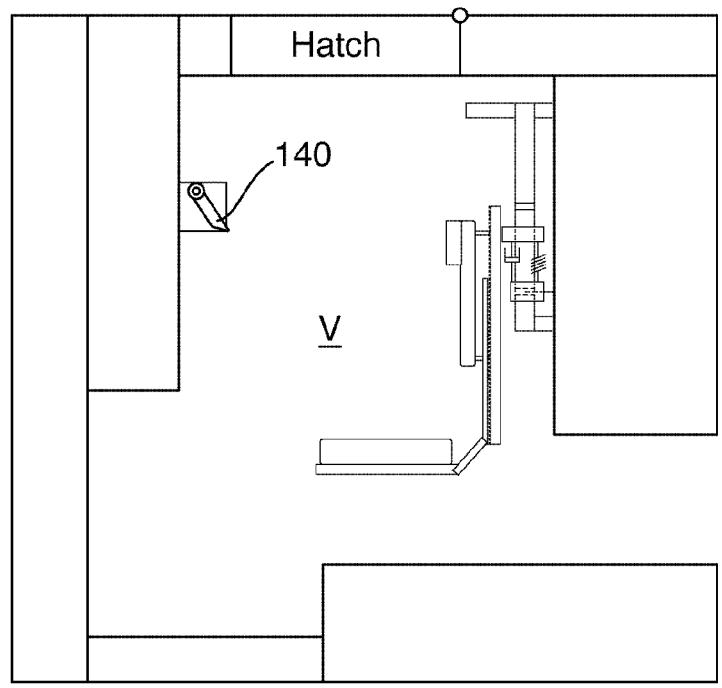
Figure 18:
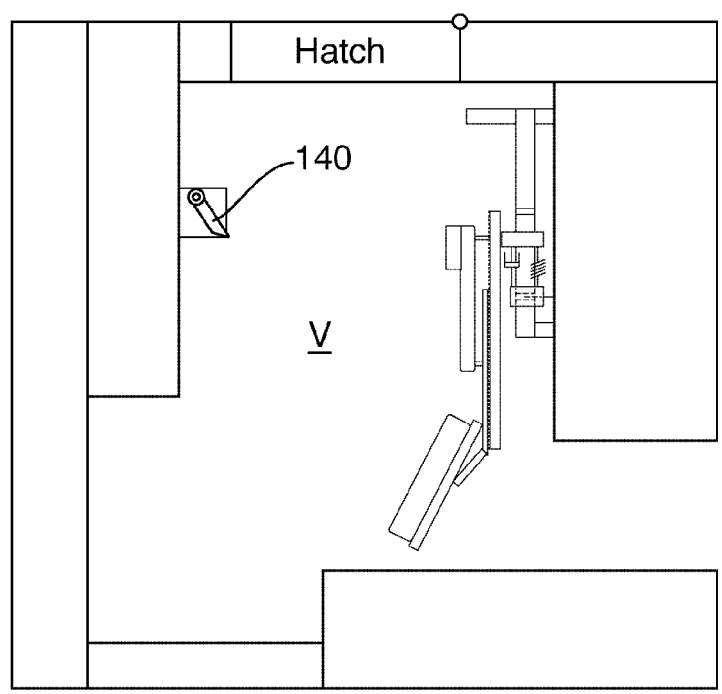
Figure 19:
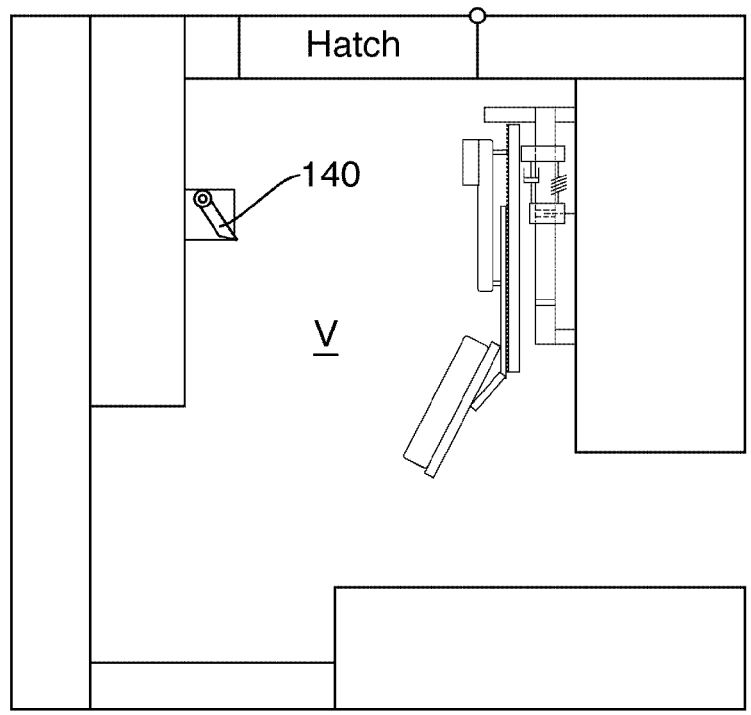
Figure 20:
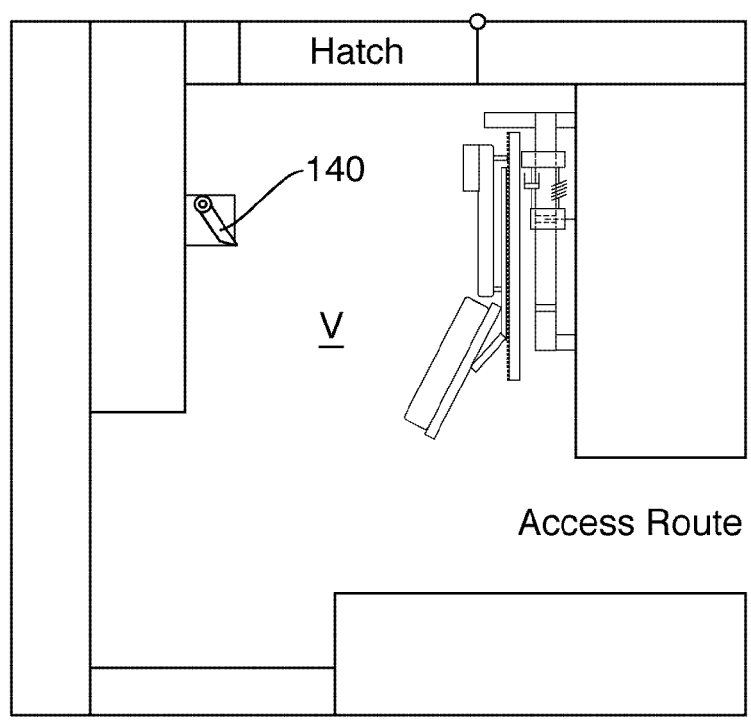
Figure 21:
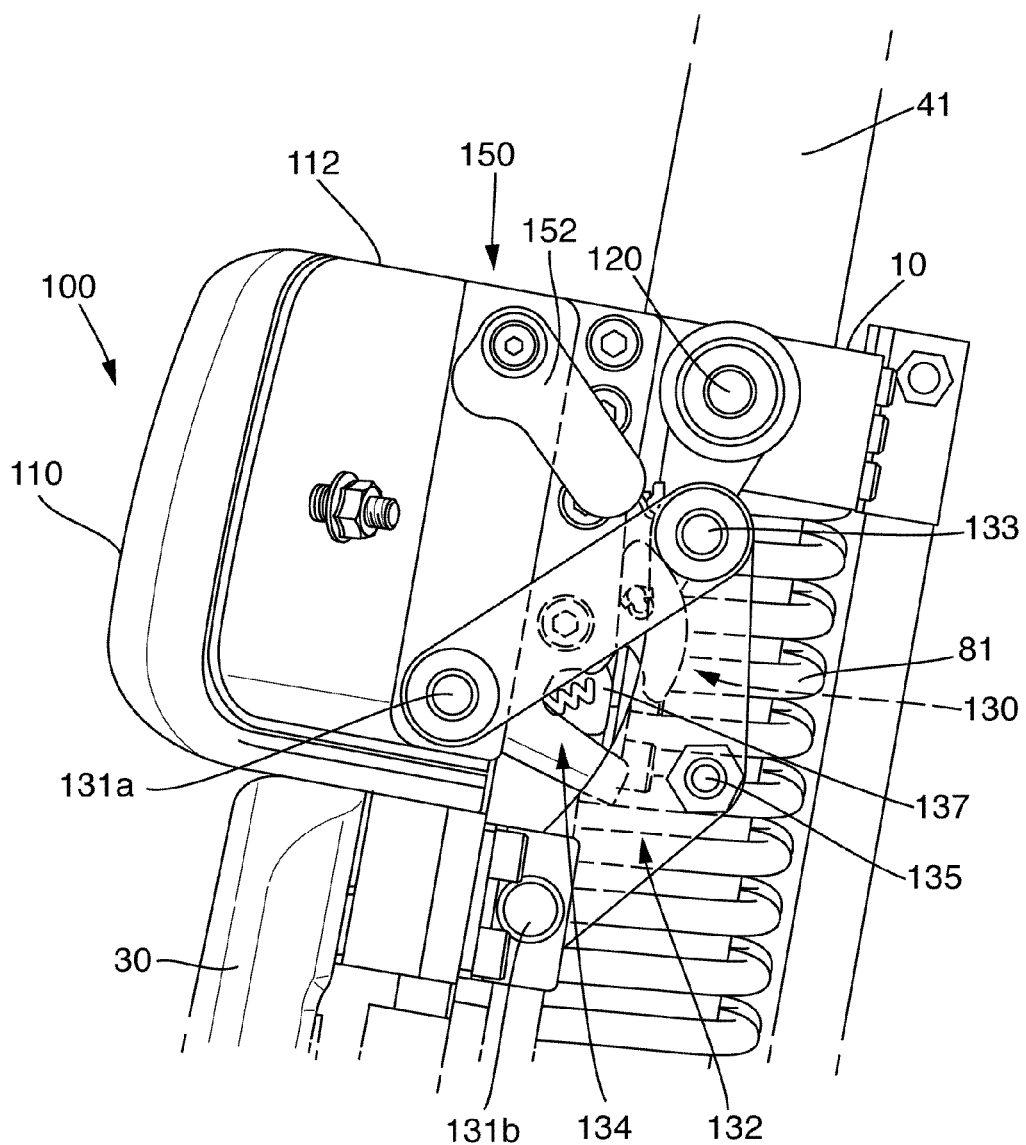
Figure 22:
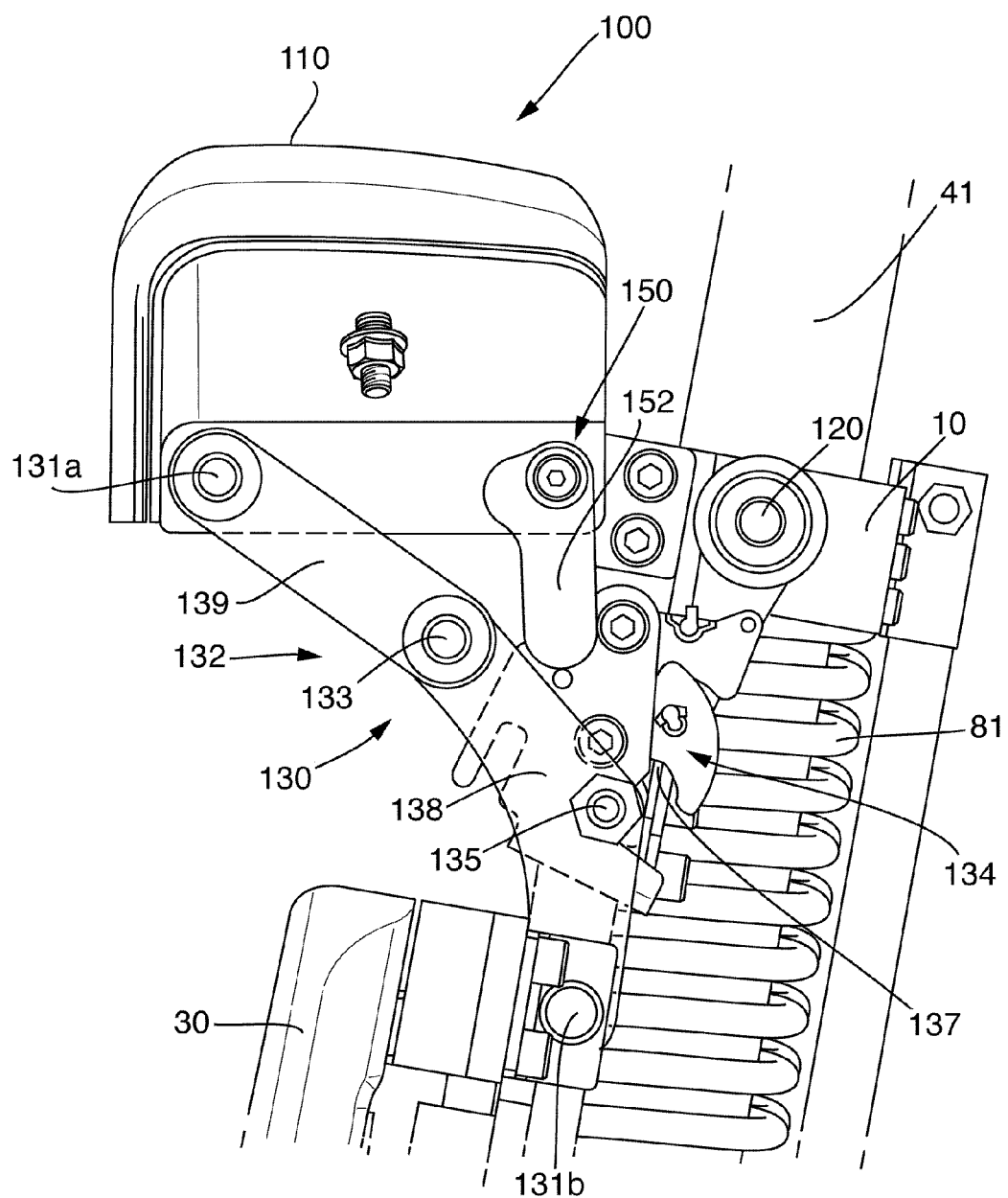

FIGS. 17 through to 20 show schematically a seat disposed in a confined space and further show the series of actions by which a seat may be reconfigured to enable occupant evacuation; and FIGS. 21 and 22 show a side aspect of a perch for use in the seat, the perch being shown configured in a flush and protruding condition respectively.

Throughout the following description, the location of components of the seat may be referred to as forwards, backwards, upwards or downwards. These terms are to be understood in the context of a seat that is arranged for use within a vehicle and which is arranged to face forwards in the vehicle. As such these terms will have the well known and accepted meaning that they do in the context of vehicles.

Figure 1:
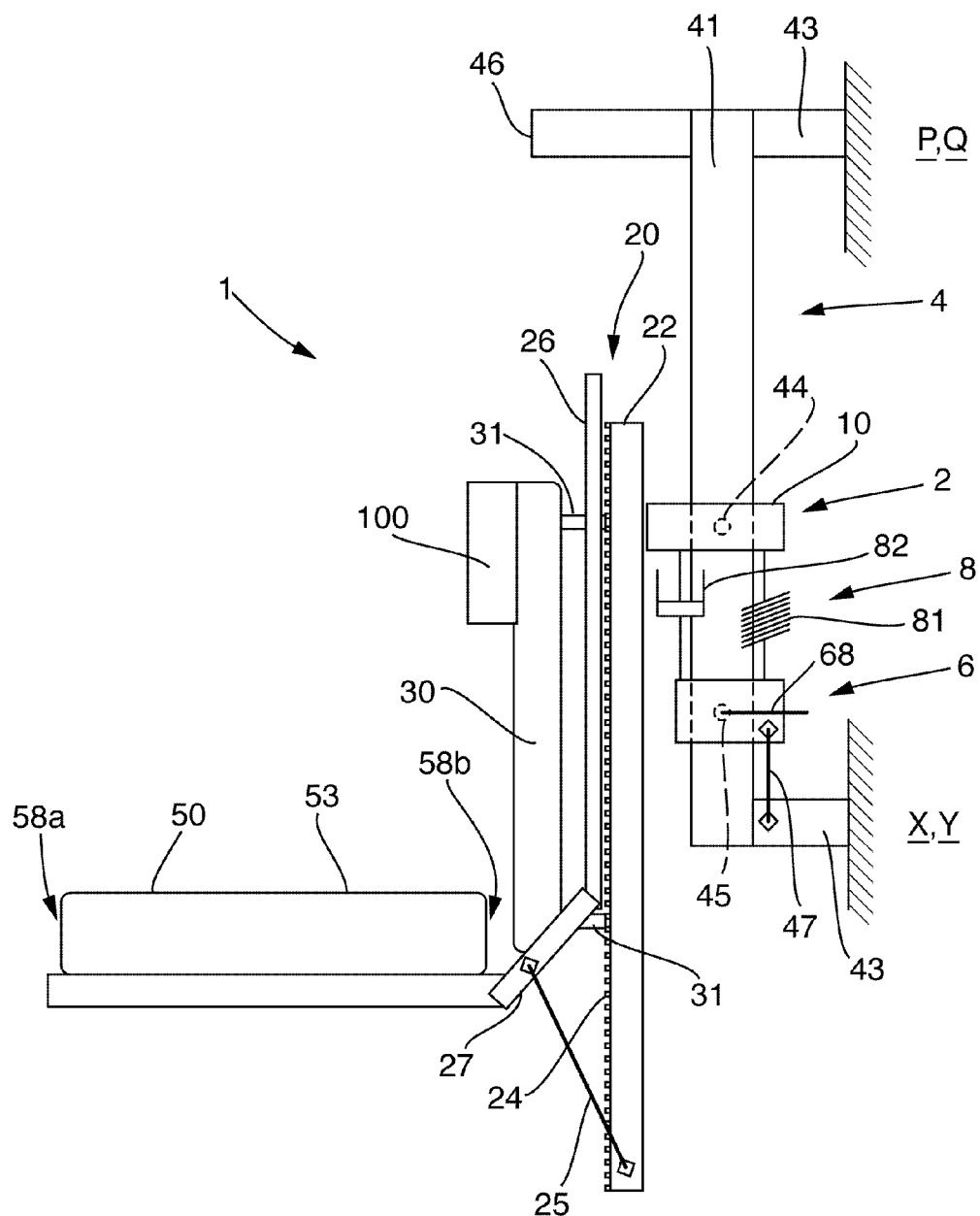
FIG. 1 shows a schematic representation of a seat for a vehicle as viewed from a side aspect, where the seat is configured for a shorter occupant to occupy a low position.
Figure 2:
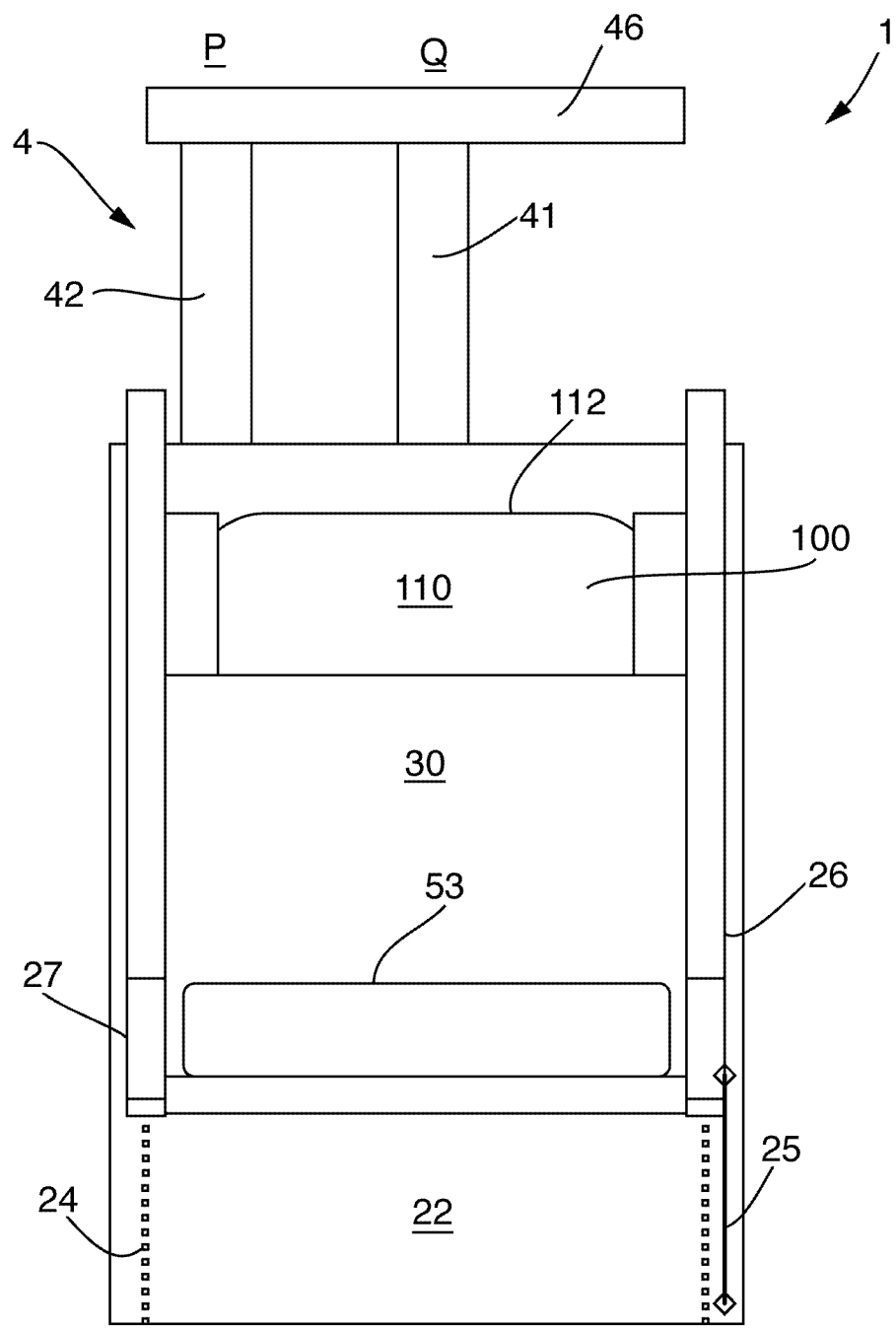
FIG. 2 shows a schematic representation of the seat of FIG. 1, when configured as in FIG. 1 and from a front aspect.

Nonetheless, it is further clarified what these terms mean with reference to FIG. 1 where the front of the seat is at the left hand side, the back is on the right, and the top of the seat is the part towards the top of the figure.

As may be seen from the figures, a seat 1 comprises a seat element 2, a support 4, a platform block 6 and a suspension system 8.

The support 4 comprises four anchors 43 which attach to a vehicle wall at four points P, Q, X and Y. The support 4 further comprises a first pole 41 which is fixed at a first end to the anchor 43 that is attached to the wall at point P and at the its other end to the anchor 43 that is attached to the wall at point X.

In addition the support 4 comprises a second pole 42, equivalent to the first pole 41 and extending between the anchors 43 at Q and Y.

The anchors 43 may be in the form of a bracket which is bolted or otherwise secured to the vehicle.

Vibration isolation bushes (not shown) are interposed between the poles 41, 42 and their respective anchors 43.

First pole 41 and second pole 42 are generally parallel to one another and are substantially perpendicular to the ground plane which a vehicle would be supported on.

A bottom recess 45, positioned towards the lower extremity of the pole 41, and having the form of a cylindrical bore, is provided in the first pole 41. An equivalent bottom recess 45 is provided in the second pole 42.

Further up the first pole 41 there is a top recess 44 having the same form and with an equivalent top recess 44 provided at the second pole 42.

For each of the first and second poles, the separation between the top recess and the bottom recess provided at that pole is approximately 0.2 m.

The platform block 6, or detent block, is arranged on the first and second poles 41, 42 such that it may slide along the length of the poles but is not free to move relative to the support in other ways. To this end the platform block 6 defines a first sleeve 76a for attachment to the first pole 41 and a second sleeve 76b for attachment to the second pole 42.

A first weight-opposing resilient member 47 connects the platform block 6 to a lower portion of the support 4. The first weight-opposing resilient member 47 is in the form of a pressurised hydraulic cylinder and that is biased to extend and thereby urge the platform block 6 to slide up the support 4. The first weight-opposing resilient member 47 is configured to exert a force that is slightly greater than the weight of the seat element 2.

As can be seen from FIGS. 5, 7, 8 and 9, positioned between the sleeves 76a and 76b of the platform block 6 and therefore between the poles 41 and 42, the platform block 6 is provided with a first pin 61 and a second pin 64 which are respectively biased by resilient pin-urging members 62 and 65 to protrude through apertures 72a and 72b at the sleeves 76a and 76b and onto the associated pole 41 or 42.

The pins 61 and 64 are dimensioned such that they may enter into the recesses 45, 44 provided in the poles 41, 42 when the platform block 6 is aligned with either the set of top recesses 44 or bottom recesses 45. The pins 61 and 64 enter the recesses and provide a sufficiently tight fit to transfer loads between pins 61, 64 and poles 41, 42 without permitting substantial wobble.

Each pin 61 and 64 is provided with a lug, 68 and 69 respectively, that extends perpendicularly from the pin axis (defined by the generally elongate form of the pin) and extends in a backwards direction. Each pin lug 68, 69 engages with an associated cam surface 63a, 63b in a common cam 66.

The first pin 61 is arranged above the second pin 64. Hence the first pin lug 68 and the associated cam surface 63a are arranged above the second pin lug 69 and the associated cam surface 63b. The cam 66 pivots about a joint 73 that is interposed midway between cam surface 63a and cam surface 63b.

The cam surface 63a has a form equivalent to the cam surface 63b. Both are surfaces defined by apertures within the cam 66. Conceptually, the cam surface 63a can be rotated 180° about the cam 66 pivot joint to substantially map onto the cam surface 63b.

A cable 67 is attached to a point on the cam 66 that is disposed towards a maximum distance on the cam 66 from the cam pivot joint 73.

As can be seen in the figures, the platform block 6 is connected to the seat element 2 by a suspension system 8. The suspension system 8 comprises a pair of helical springs 81, the first of which is arranged coaxially along and coiling around a portion of the first pole 41, the second of which is arranged coaxially along and coiling around a portion of the second pole 42. Each helical spring 81 connects the platform block 6 to the seat element 2. As an alternative to the helical spring 81, other forms of resilient member may be used such as hydraulic or pneumatic pistons.

The suspension system 8 further comprises a damper 82 in the form of a dashpot that connects the platform block 6 and the seat element 2.

To be more specific, the springs 81 and the damper 82 of the suspension system 8 connect to the seat element 2 at a first guide block 10.

The first guide block 10 is provided with a first sleeve for engaging with the first pole 41 and a second sleeve for engaging with the second pole 42. The interface between the sleeves and the poles is such that the first guide block 10 is permitted to slide lengthwise, that is to say axially, along the poles but is generally prevented from other forms of movement relative to the support 4.

Figure 14:
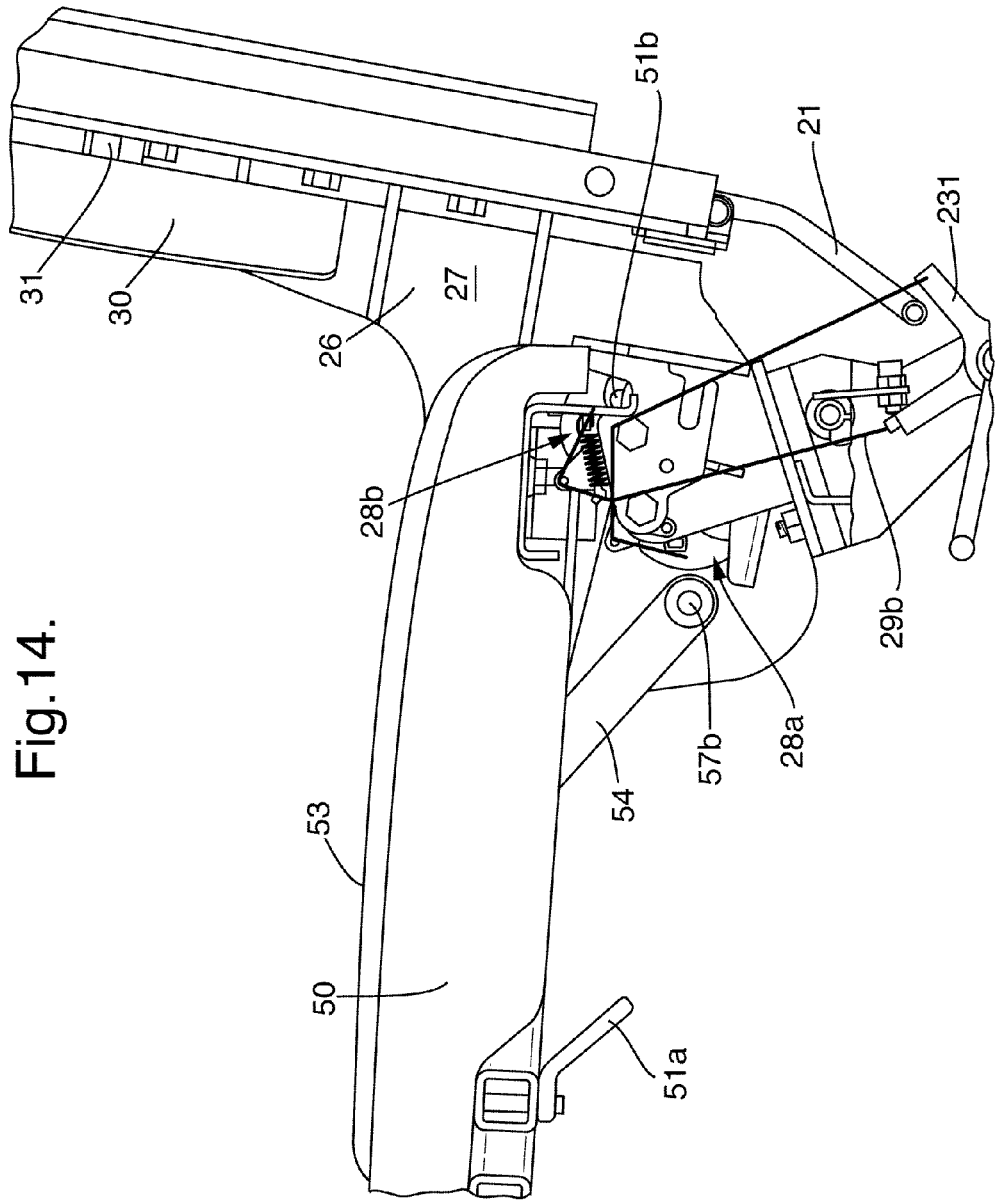
FIGS. 14 and 15 show cross sections through x-x of the seat as configured for seating and in a collapsed condition respectively.

At the seat element 2, the first guide block 10 is, in turn, connected to a seat chassis 20 that comprises a back frame 22, rails 24, a tray 26, a first latching gate 28a and a second latching gate 28b (FIG. 14).

The back frame 22 lies in a generally plate-like volume. The majority of the back frame 22 extends downwards from the connection to the first guide block 10 and a minority extends upwards. The back frame 22 is generally vertical and is arranged such that the plane it tends to define is substantially parallel with the plane that the pair of poles 41, 42 tend to define.

Figure 6:
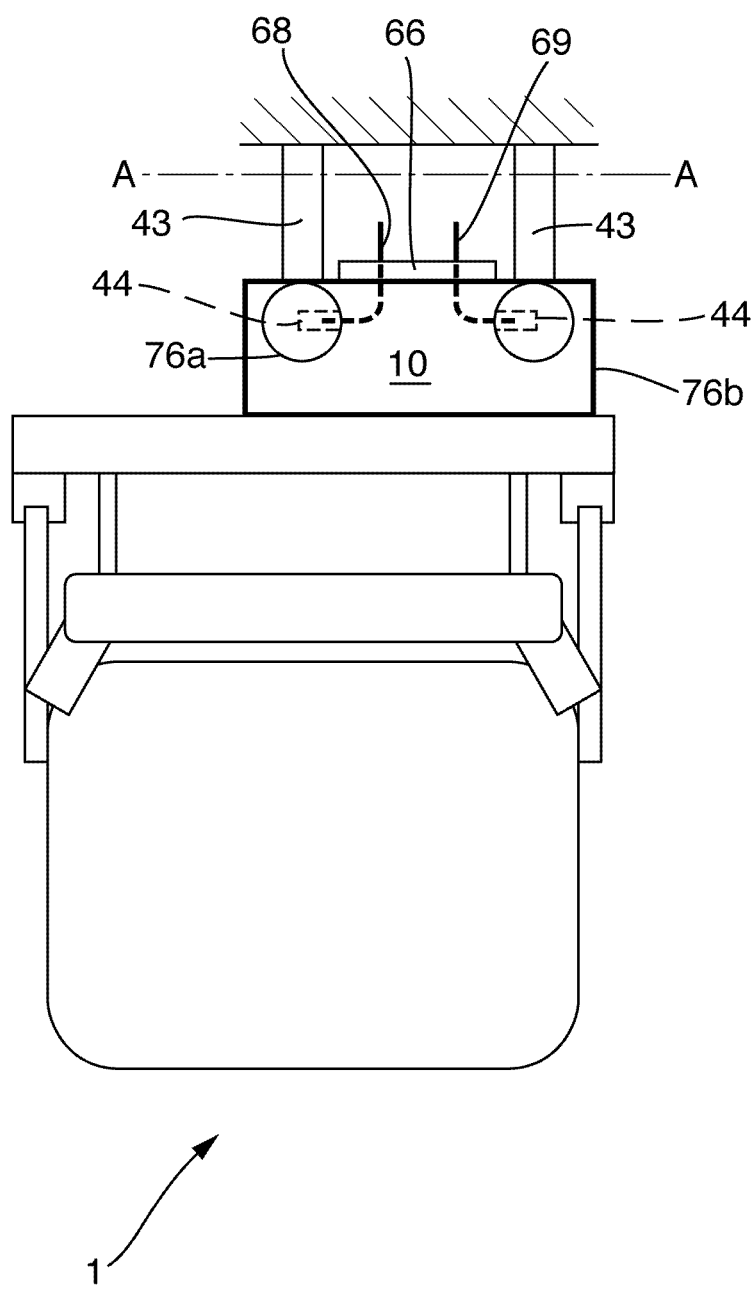

As can be appreciated from FIG. 6, the first guide block 10 does not connect at the lateral midpoint of the back frame 22 but is instead offset laterally. This provision can allow for the seat 1 to be set back further into the corner of a semicircular boundary (as might be defined where a pair of seats are provided in a turret).

The rails 24 are attached to the back frame 22 and mount the tray 26 at the back frame 22 such that the tray 26 can slide along the rails 24. The tray 26 and rails 24 are provided with a ratchet system 21 that permits the tray 26 to slide relative to the back frame 22 when the ratchet system 21 is actuated but secures the tray 26 at discrete points when the system is idle. A second weight-opposing resilient member 25 connects the tray 26 to a lower region of the back frame 22. The second weight-opposing resilient member 25 has the form of a pressurized cylinder and is biased to urge the tray 26 upwards along the rails 24 when the tray 26 is not secured by the ratchet system.

The tray 26 need not have a plate-like form. Indeed, and as shown in the figures, the tray 26 may include the form of a pair of runners, which do not connect directly to each other, and each of which engage with a respective rail 24.

The tray 26 is further provided with a pair of side panels 27. Each side panel 27 extends generally downwards and forwards from a lateral and lower extremity of the tray 26.

The side panels 27 are connected to a base member 50, which may alternatively be referred to as a seat pan. The base member 50 can lie flat in a generally horizontal plane, as such protruding forwards and providing a surface 53 onto which the occupant may sit directly down onto. In use, the weight of the occupant will therefore tend to pass through the base member 50 when the base member 50 is in a first condition.

Further connected to the back frame 22 are a set of beams 31 onto which beams 31 is mounted a back member 30. The beams 31 extend from a region of the back frame 22 that is between the rails 24 and protrudes forwards beyond the tray 26 to give a clearance between the back member 30 and the back frame 22 that is sufficient for the tray 26 to slide along the rails 24.

The back member 30 has the form of a panel and is provided with a cushioned aspect facing forwards so as to be able to accommodate an occupant's back and shoulders.

A headrest 46 for supporting the back of the occupant's head (and so as to mitigate the likelihood of injuries such as whiplash) extends from the support 4.

The base member 50 is connected to the side panels 27 of the tray 26 by an attachment 52. The attachment 52 is omitted from some of the schematic figures in the interests of simplifying these figures.

Figure 10:
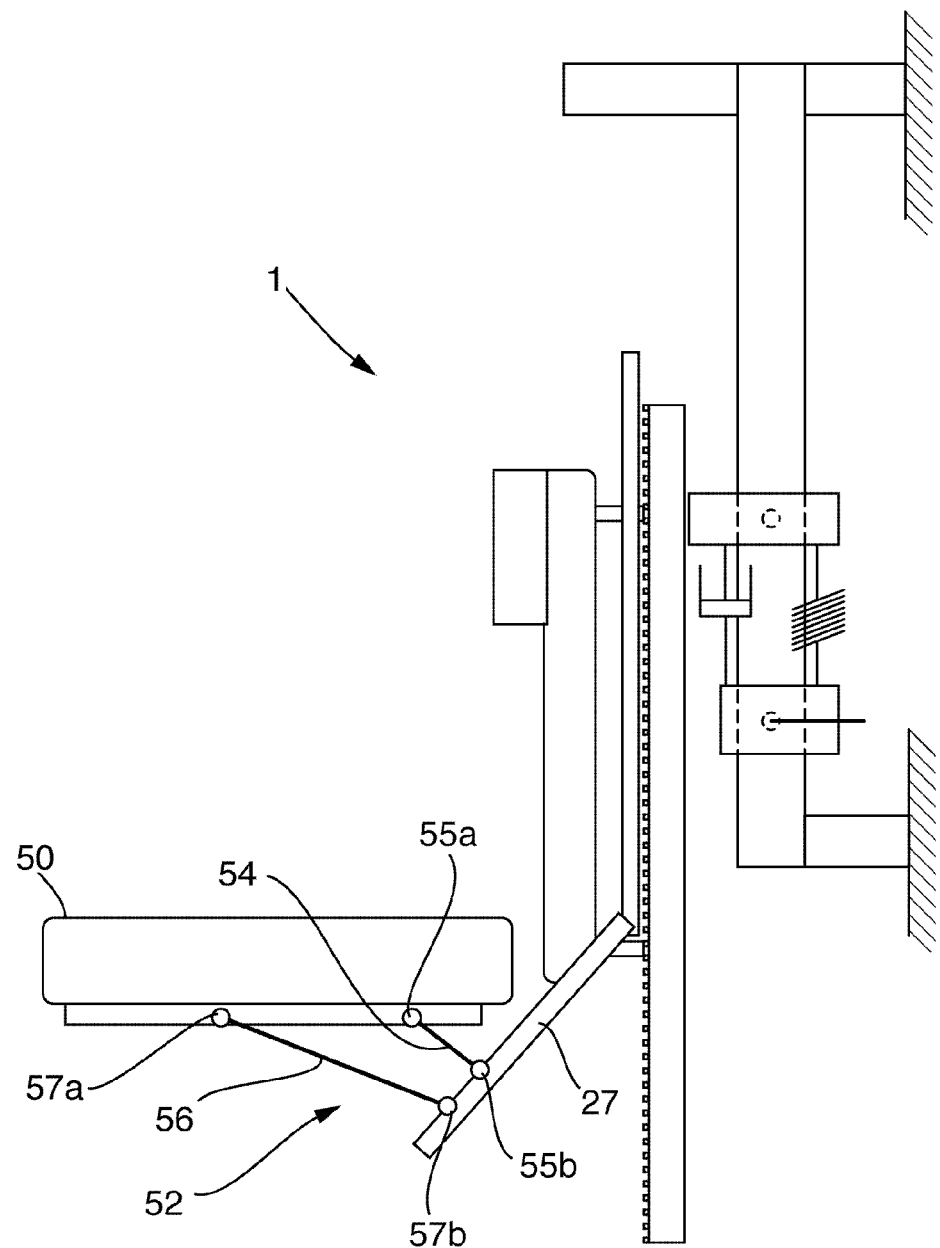
FIG. 10 shows a schematic representation of the seat with a particular representation of a seat collapse mechanism, viewed from a side aspect.

However as can be seen from, for example FIG. 10, the attachment 52 comprises a first link 54 extending between a first point at the side of the base member 50 and a first point on the side panel 27. The first link 54 is coupled to the base member 50 at the first point by a pivot joint 55a and is coupled to the side panel 27 by a pivot joint 55b.

A second link 56 in the attachment 52 extends between a second point at the side of the base member 50 and a second point on the side panel 27. Pivot joints 57a and 57b couple the second link 56 to the base member 50 and the side panel 27 respectively.

The pivot joint 57a is positioned forward of the pivot joint 55a when the base member 50 is in use and generally horizontal i.e. when the base member 50 is in a first condition. In such a condition, the pivot joint 57*b* is positioned on the side panel 27 forwards and downwards of the pivot joint 55*b*.

The configuration of the base member 50, the first link 54, the second link 56 and the side panel 27 provides a four bar linkage for reorienting the base member 50 relative to the side panel 27, and hence relative to the seat chassis 20.

Figure 11:
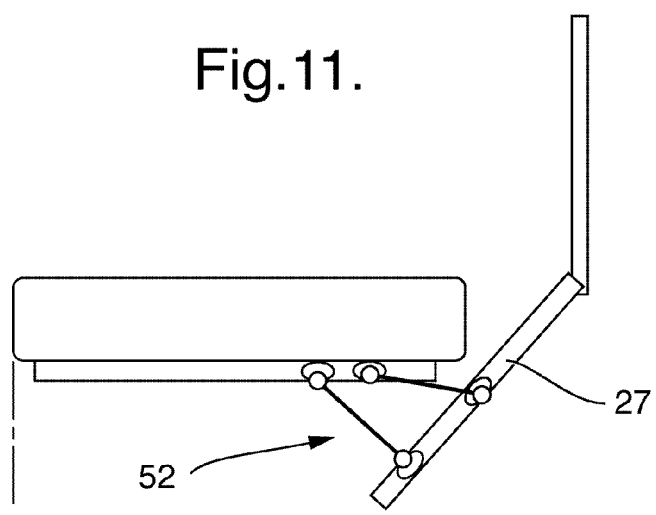
FIGS. 11, 12 and 13 show schematically how the seat as depicted in FIG. 10 may be configured into a collapsed condition.
Figure 12:
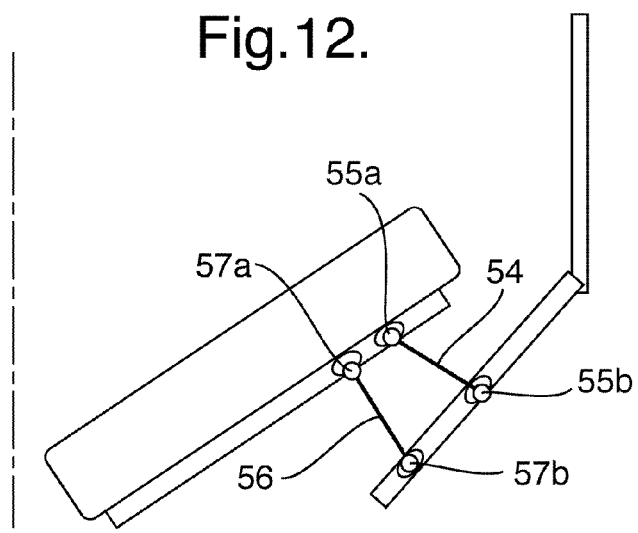
Figure 13:
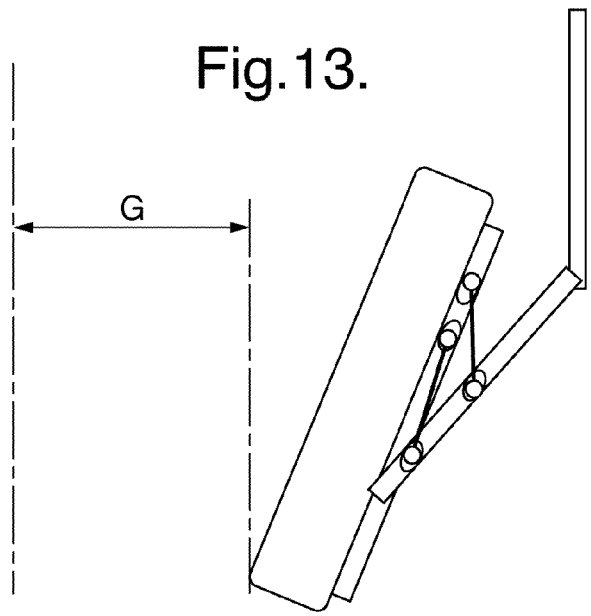
Figure 15:
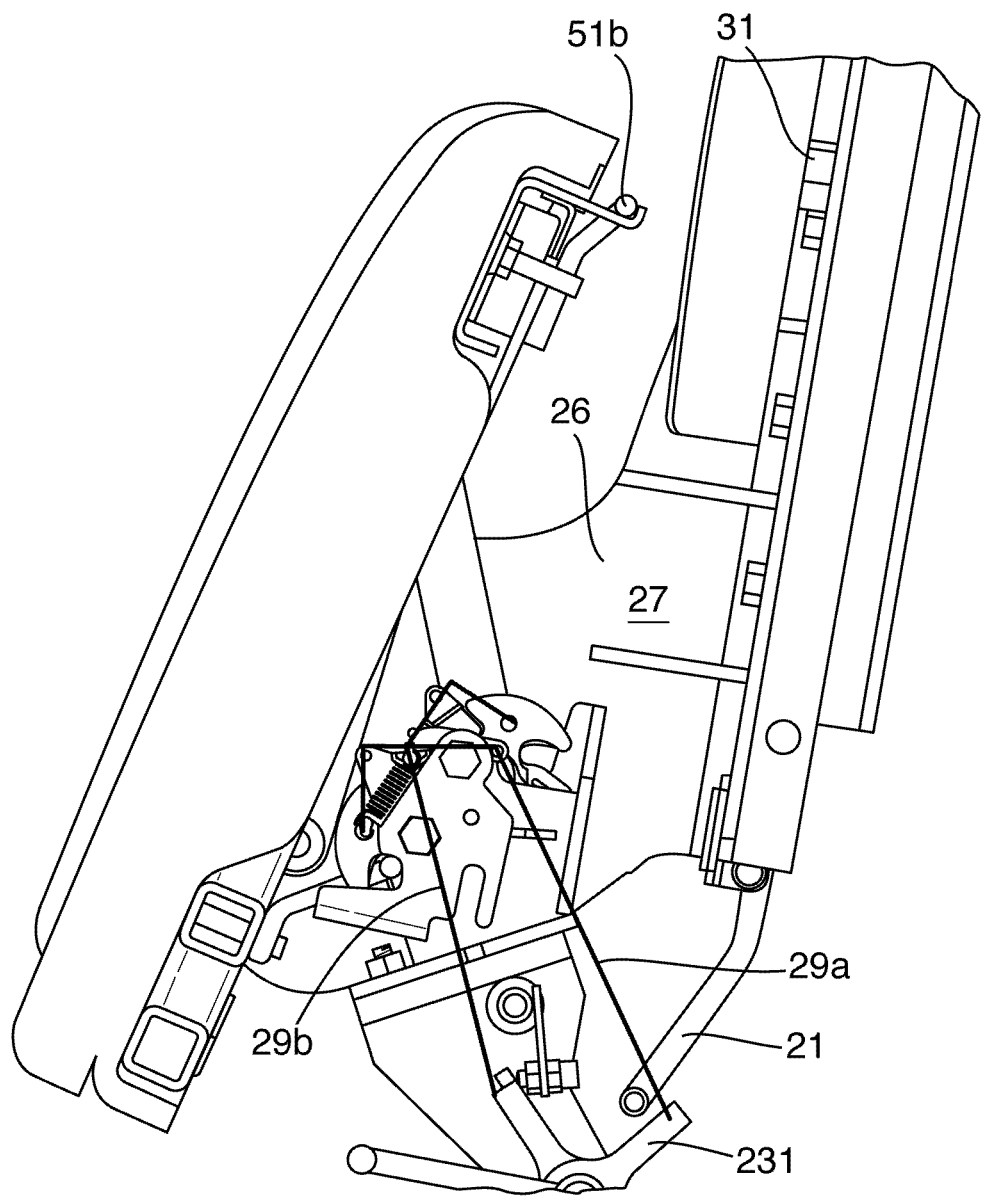

Specifically, the four bar linkage effects the transition of the base member 50 between two conditions. In the first condition, alternatively referred to as a 'sit-on' condition, and as shown in for example FIGS. 11 and 14, the base member 50 is generally horizontal and perpendicular to the back member 30 with a front end 58*a* protruding furthest forward and a back end 58*b* disposed closest to the back member 30. In the second condition, alternatively referred to as a 'slide-down' condition, and as shown for example in FIGS. 13 and 15, the base member 50 approximates to being generally parallel with the back member 30 and with the front end 58*a* tipped below the back end 58*b*. In the second condition, relative to the first condition, the back end 58*b* is raised.

A second four bar linkage which is equivalent to the first and which is hidden from view in FIG. 10, is provided on the opposite side of the seat 1 and connects the opposite lateral edge of the base member 50 to the opposite side panel 27.

Figure 16:
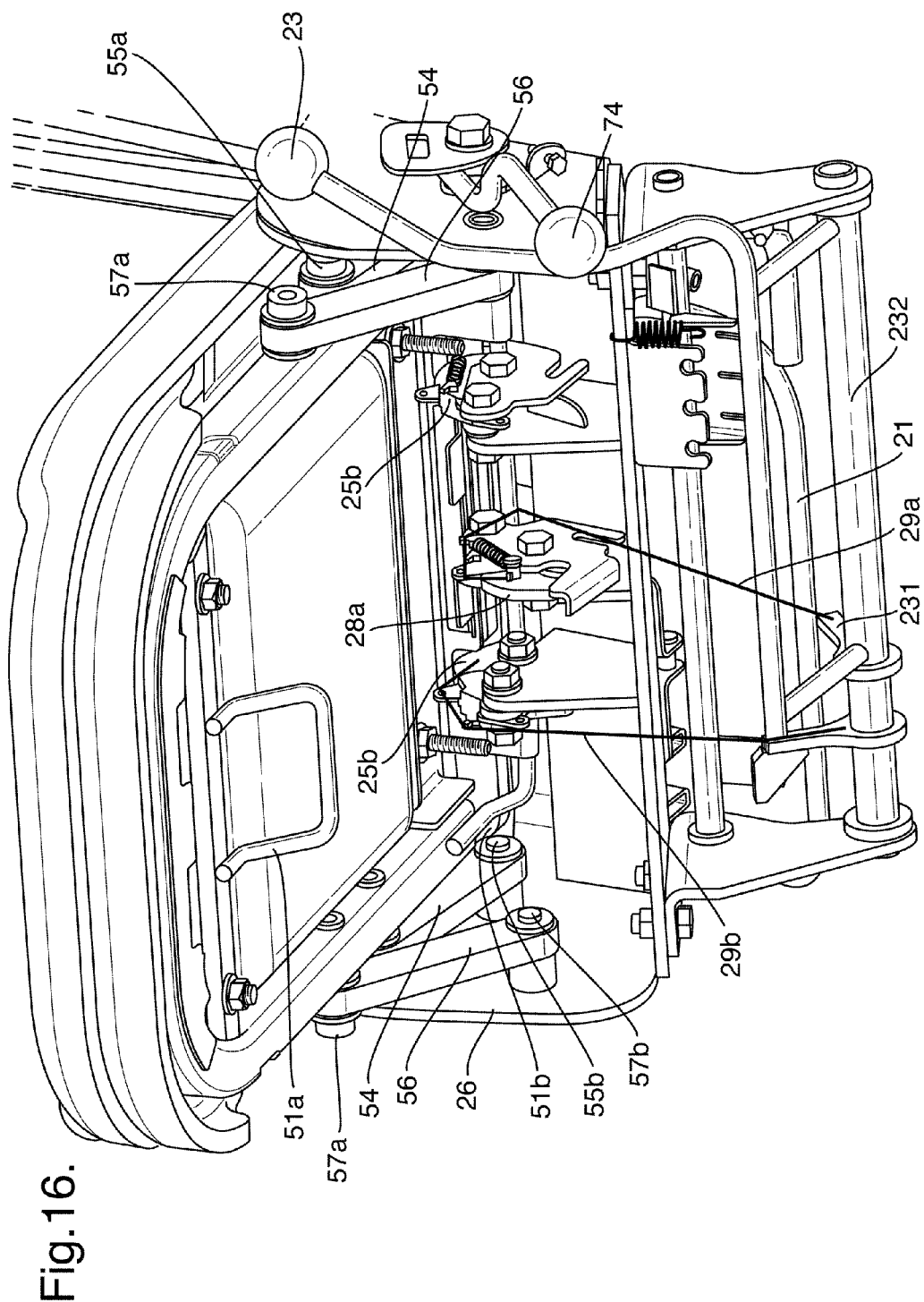
FIG. 16 shows a three dimensional representation of the seat, viewed substantially from an aspect underneath the seat.

At the underside of the base member 50 there is provided a first latching bar 51*a* and a second latching bar 51*b*. The latching bars 51*a* and 51*b* are clearly visible in FIGS. 14, 15 and 16.

The first latching bar 51*a* is located towards the front of the underside of the base member 50 and may connect to a first latching gate 28*a* when the base member 50 is in the second condition.

The second latching bar 51*b* is located towards the back of the underside of the base member 50 and may connect to a second latching gate 28*b* when the base member is in the first condition.

The first and second latching gates 28*a*, 28*b* are mounted at the seat chassis, at a portion of the tray 26 that extends down behind the base member 50 to approximately the same height as the side panel pivots 55*b* and 57*b* of the four bar linkage. The gates 28*a* and 28*b* are at generally the same height but are spaced apart laterally along the tray 26.

Each latching gate 28*b*, 28*b* has a form equivalent to an automotive door latch. As such each latching gate comprises, firstly, a resiliently pivoted crescent member that has a camming surface along its convex and external-facing side, and, secondly, a static member that cooperates with the concave side of the crescent member to define a trap when the crescent member is in its equilibrium position. A bar or pin may become trapped within the latching gate by being pushed against the camming surface of the crescent member, which pushing lifts the crescent member to permit entry to the trap. Once in the trap, the crescent member closes to secure the pin.

An actuator, such as a Bowden cable may be attached to the crescent member so as to enable selective application of a force that tends to open the trap and thereby allow the pin or bar to escape.

Accordingly, a first and second cable 29*a* and 29*b*, such as a Bowden cable, is associated with the first and second latching gates 28*a* and 28*b* respectively, each cable 29*a* and 29*b* extending between the latching gate and a lever 23 that is mounted at a location on the seat 1 that is convenient for the occupant to access.

The seat 1 further comprises a perch member 100.

The perch member 100 may be configured into a first 'as seat' condition (FIG. 22) or into a second 'as shoulder rest' condition (FIG. 21). The perch member 100 comprises an occupant accommodating face 110, a pivot joint 120, a fastening 130, a switch 140 and a second fastening 150.

The pivot joint 120 connects the perch member 100 to the back frame 22 of the seat chassis 2. In particular, the pivot joint 120 connects to the top edge of the perch member 100 so that in the absence of other factors, and with the seat disposed in an upright condition, the perch member 100 would tend to hang down from the pivot with the back of the perch resting on the back frame 22 and with the occupant accommodating face 110 generally flush with the equivalent face on the back member 30 (FIG. 21). In such embodiments, the entire surface 110 may be in contact with the shoulders of the occupant whilst in the second 'as shoulder rest' condition.

In certain alternative embodiments of the perch member 100, the pivot 120 may connect to the perch member 100 at a lower height such that in the first 'as seat' condition (FIG. 22), only a lower section of the occupant accommodating face can be in contact with the occupant. The seat should be adapted such that the portion of the perch member which is above the pivot can be accommodated in the 'as seat' condition.

The fastening 130 is provided to ensure that the perch member 100 may be secured whilst in the first condition. The fastening 130 comprises a linkage 132 and a latch mechanism 134. The linkage 132 is in the form of a two bar linkage and extends from a fastening pivot joint 131*a* at the bottom edge of the perch member 130 to a fastening pivot joint 131*b* at the back frame 22 and below the pivot joint 120.

A first link 138 of the linkage 132 extends from the fastening pivot joint 131*b* at the back frame 22 to an intermediate pivot 133. A second link 139 of the linkage 132 extends from the intermediate pivot 133 to the fastening pivot joint 131*a* at the perch member 100. A pin 135 extends laterally from a midpoint on the first link 138 of the linkage 132 and is configured to engage a latching gate 137 so as to lock the perch member 100 in place as it moves into the 'as seat' condition. The gate 137 is mounted at the seat chassis 2.

When the perch member 100 is in the first condition, the linkage 132 is fully extended with the effective angle (i.e. the angle subtended by a line drawn between the pivots 131*a*, 133 of the first link 138 and a line drawn between the pivots 133, 131*b* of the second link 139) between the first 138 and second 139 link being approximately 135°. As such the pivots of the linkage 132 are not collinear (i.e. their axes of rotation are not in the same plane) and so the linkage 132 can have a tendency to collapse.

When the perch member 100 is in the second condition, the linkage 132 is folded with the smaller effective angle between the first 138 and second 139 link being approximately 45°.

The gate 137 is also of a form equivalent to automotive door latches, having a resilient crescent member and a trap defining member. The gate 137 is provided with a cable (not shown), such as a Bowden cable, for remotely releasing the pin 135 from the gate 137 and hence the perch member 100 from its secured 'as seat' condition. The cable extends from the latch 137 to a switch 140 (shown in FIGS. 17 to 20) which is configured so as to be conveniently actuated by the foot of the occupant whilst sitting on the 'as seat' condition perch member 100.

The second fastening 150 is provided to ensure that the perch member 100 may be secured whilst in the second 'as shoulder rest' condition. The second fastening 150 has the form of a pivoted chock 152 that hangs about an axis generally coincident with the axis defined by the pivot joint 120. In the second condition, the form and the mass distribution of the chock 152 are such that the chock 152 hangs in a stable position and abuts the intermediate pivot 133 so as to prevent forward movement of the intermediate pivot 133 and thus prevents extension of the linkage 132.

The pivoted chock 152 is free to rotate about its pivot axis and may be rotated and lifted manually over the intermediate pivot 133 to allow the perch member 100 to deploy into the first 'as seat' condition.

In operation, the height of the base member 50, relative to the support 4 may be significantly altered. Such significant alteration is achieved by varying the set of recesses, either top 44 or bottom 45, into which the pins 61, 64 of the platform block 6 are deployed.

Figure 3:
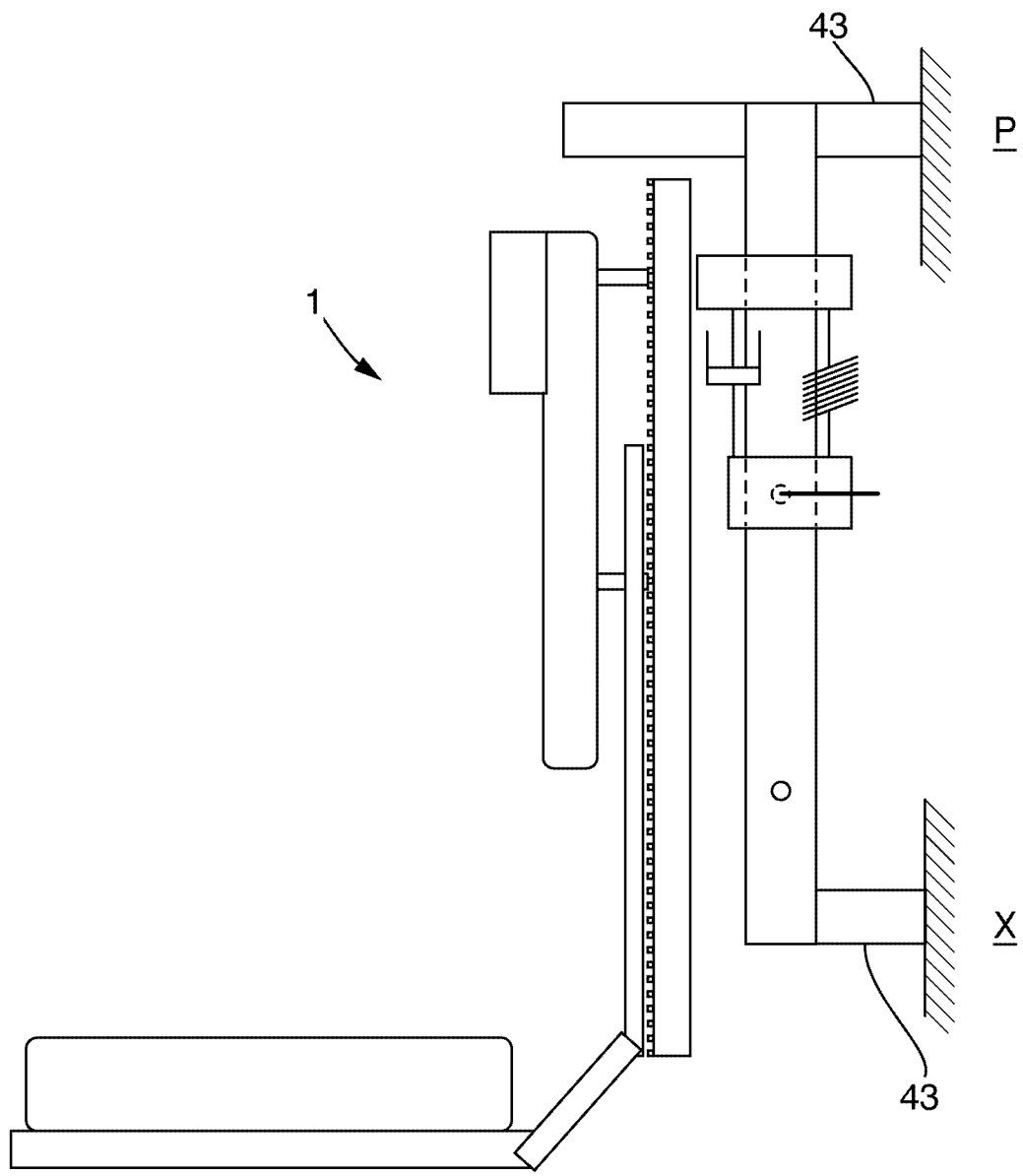
FIG. 3 shows schematically and from a side aspect the seat of FIG. 1 configured such that the occupant may occupy a high position.
Figure 4:
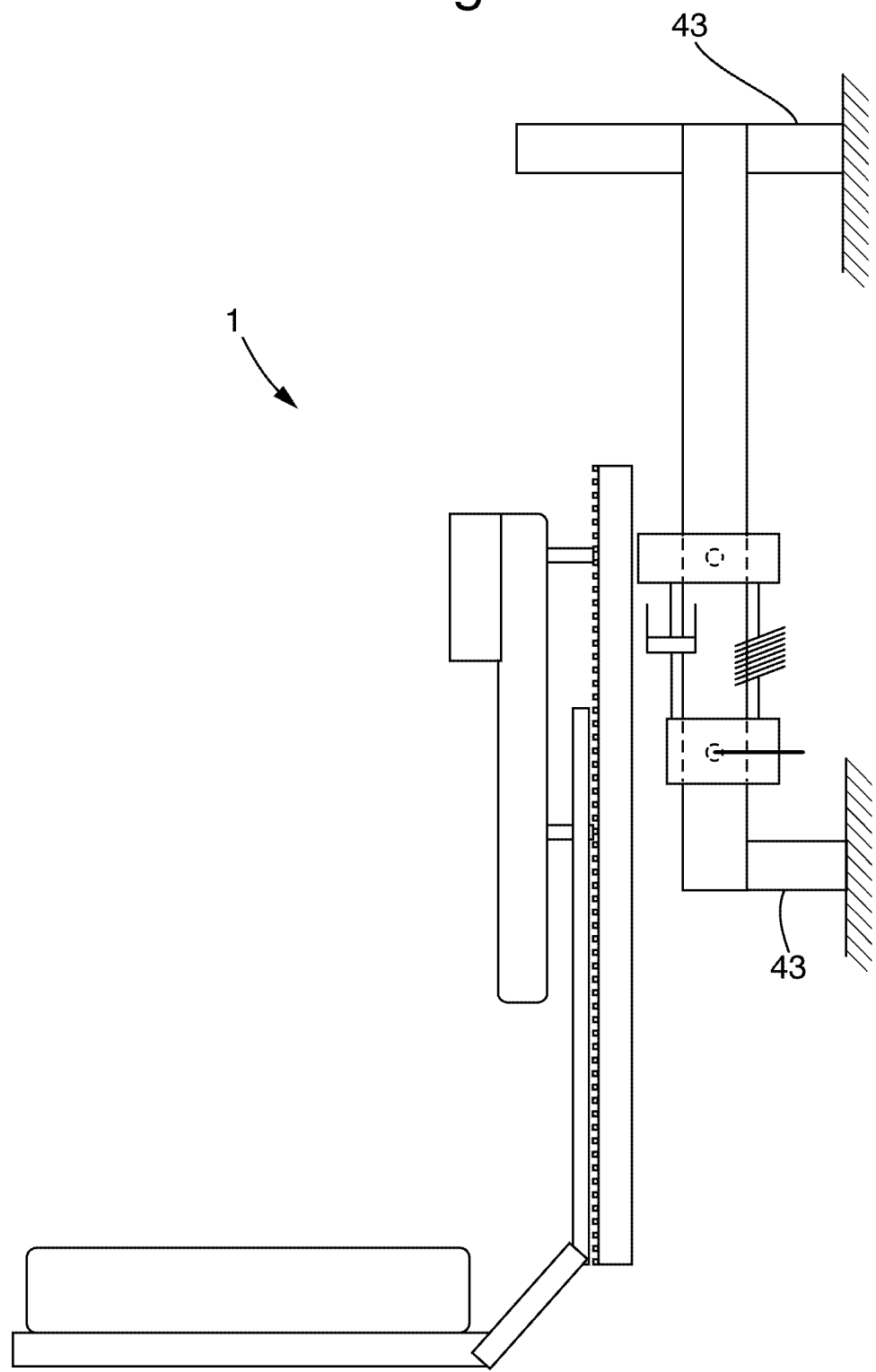
FIG. 4 shows schematically and from a side aspect the seat of FIG. 1 configured for a taller occupant to occupy a low position.
Figure 5:
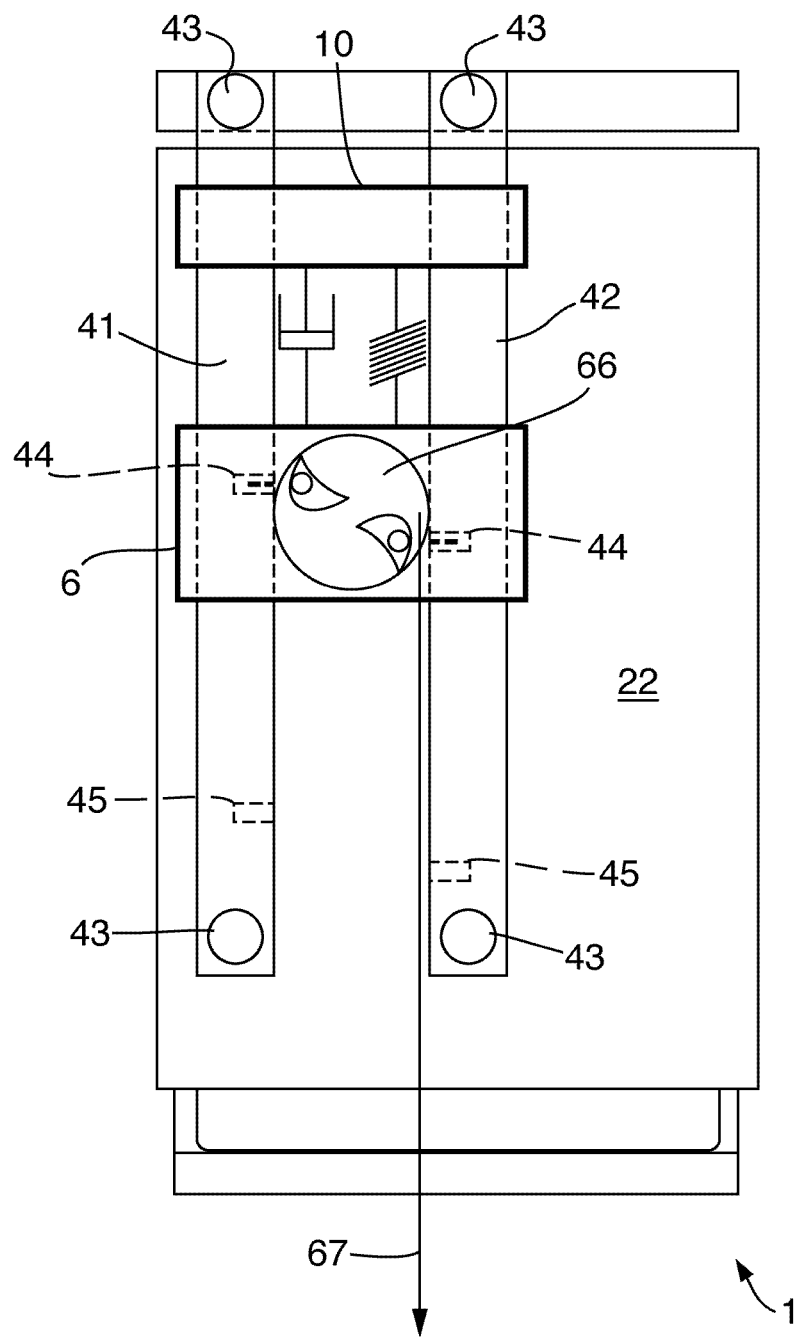
FIGS. 5 and 6 show the back aspect and top-down aspect respectively of the seat as configured in FIG. 3.

In particular, the height of the base member 50 may be altered from the low position as shown in FIG. 1 to the high position as shown in FIG. 3 as follows.

First the cable 67 is actuated by the occupant moving detent lever 74 so as to apply a force that may overcome the force exerted by the resilient pin-urging members 62 and 65 in the platform block 6. The application of such a force causes cam 66 to rotate clockwise.

Figure 7:
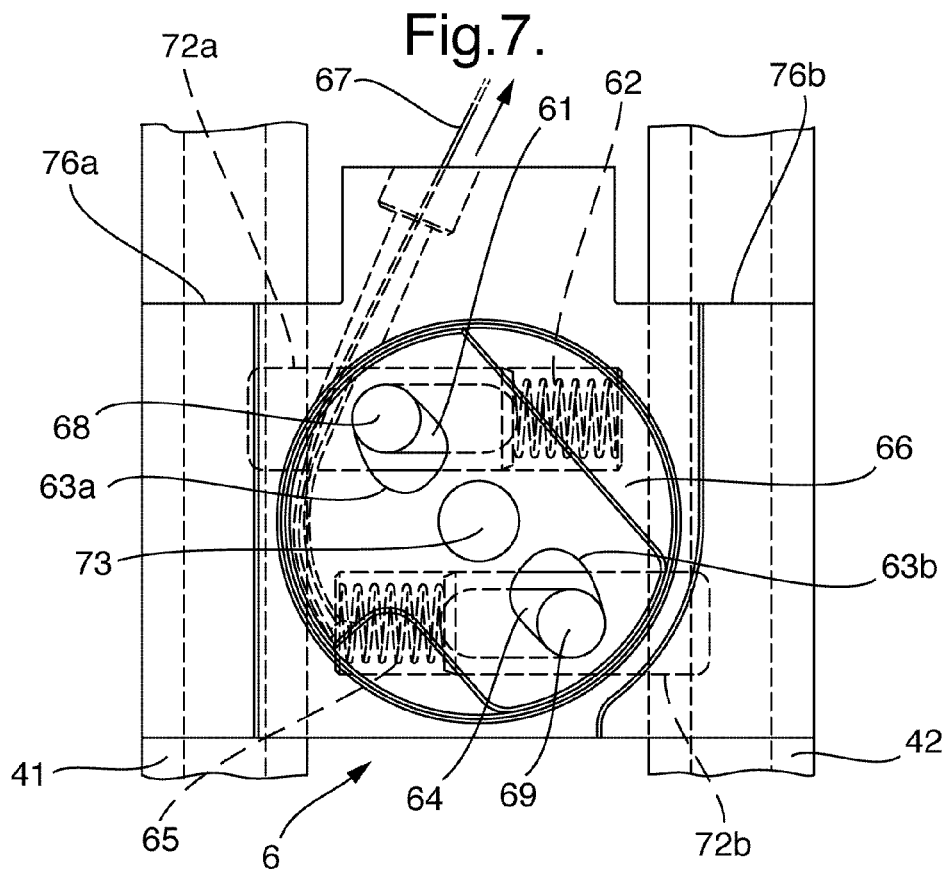
FIGS. 7, 8 and 9 show the action of a mechanism for securing the seat in a low or high position.
Figure 8:
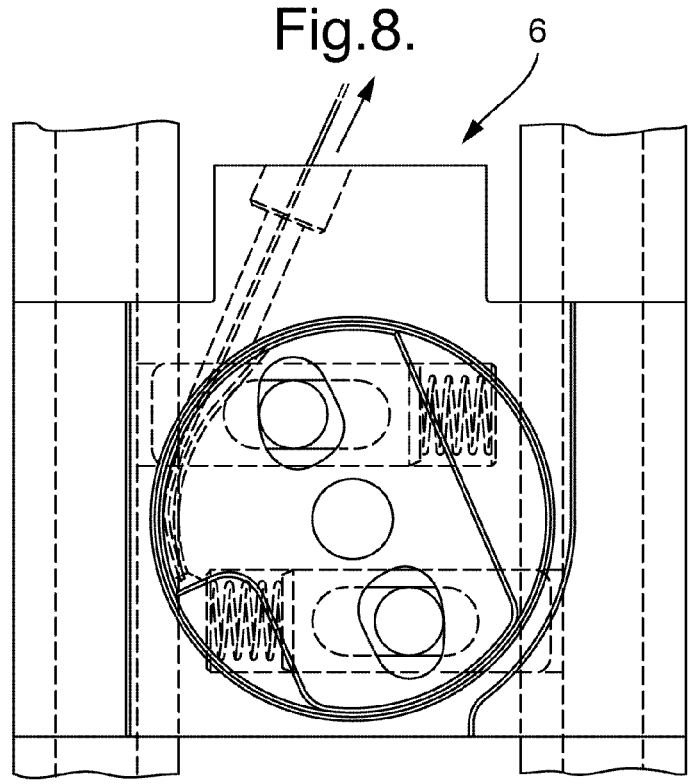
Figure 9:
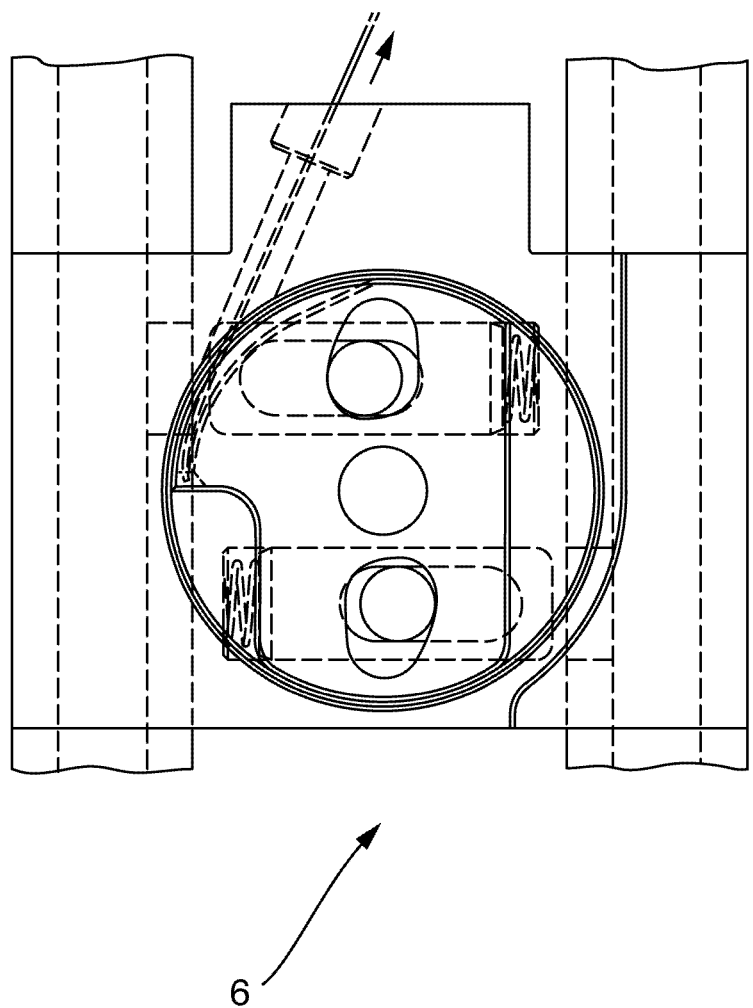

As shown in FIGS. 7, 8, and 9, as cam 66 rotates clockwise, the camming surfaces 63a and 63b act on the respective lugs 68, 69 of the pins 61 and 64 such that the pins 61 and 64 become withdrawn from the bottom recesses 45.

Once the pins 61 and 64 are withdrawn from their respective bottom recesses 45, the weight-opposing resilient member 47, which had previously been acting to urge the pins 61 and 64 into contact with the top walls of the bottom recesses 45, acts to urge the platform block 6 upwards along the poles 41 and 42. Thus a force for retracting the pins 61, 64 need be applied to the cable only for sufficient time to allow the weight-opposing resilient member 47 to propel the platform block 6 above the bottom recesses. After this time, the cable may be relaxed causing the pins 61, 64 to be urged back towards the poles 41, 42. However, with no recesses to accommodate the pins 61, 64, the platform block 6 will be permitted to slide over the poles.

As the weight-opposing resilient member 47 urges the platform block 6 upwards along the support 4, the whole seat element 2 and suspension system 8 is also raised. The weight-opposing resilient member 47 is configured to apply such a motive force until the platform block 6 arrives at the top recesses 44. The occupant will generally lift some or all of their weight off of the seat 1 during this process to permit the seat element 2 to move upwards.

Once the platform block 6 reaches the top recesses 44, the pins 61, 64 tend to be automatically deployed by their respective resilient pin-urging members 62, 65, thereby securing the platform block 6, and hence the seat 1, in the high position.

The seat 1 may return from the high position to the low position in a similar manner but with the difference that the occupant may remain seated and with their weight fully supported by the seat 1 over the course of the conversion. Indeed, the extra weight of the occupant, when combined with the weight of the seat components supported on the member 47, will tend to exceed the force applied by the member 47 and so the seat element 2 and its occupant will tend to fall down until the pins 61, 64 engage the bottom recesses 45.

In operation, the height at which the occupant sits may be finely adjusted by virtue of the ratcheted sliding that is permitted between the tray 26 and the back frame 22. A sliding upwards of the tray 26 is promoted by the weight-opposing resilient member 25 when the occupant removes some or all of their weight from the seat element 2 and the ratchet system is actuated. The ratchet system 21 is actuated when the occupant pulls tilt lever 23 backwards. This causes a cantilever member 231 on lever bar 232 to push on the lever bar of the ratchet mechanism 21, thus retracting a pawl (not shown) of the mechanism 21 so that the tray 26 becomes free to slide along the rails 24. Pulling the tilt lever 23 backwards also acts to open the first latching gate 28a but this has no particular effect as there is no bar trapped within this latching gate when the base member 50 is in the 'as seat' condition, which is the condition where the fine adjustments to the seat height will generally be made.

A sliding downwards is permitted by the weight-opposing resilient member 25 when the occupant sits on the seat element 2 and the ratchet system 21 is disengaged. The rails 24 guide the tray along the back frame 22 and provide a set of teeth which work in conjunction with a pawl (not shown) to secure the tray 26 at each position.

In operation, the perch member 100 may be secured in either the first condition or the second condition and may be converted from one condition to the other.

The perch member 100 is converted from the second condition to the first condition by manually moving the pivoted chock 152 so that it lifts above and out of contact with the intermediate joint 133 of the linkage 132. With the chock 152 thus held out of the way, the perch member 100 may be lifted up by rotating it about the pivot 133 so that bottom of the perch member 100 moves out of contact with the back frame 22 and continues until the perch member 100 is generally horizontal and in the first condition. Over the course of this conversion the linkage 132 extends so that the smaller effective angle between the links 138, 139 increases from approximately 45° to approximately 135°. Also, over the course of this conversion, the pin 135 extending laterally from the first link 138 engages and becomes trapped inside the latch 137. The trapped pin 135 secures the perch member 100 in the first condition by preventing rotation of the first link 138 about the back frame pivot 131b.

The perch member 100 is converted from the first condition to the second condition by releasing the pin 135 from the latch 137. The latch 137 releases the pin 135 by the application of a force to a cable (not shown), which may conveniently be done by the occupant kicking a switch 140 that is connected to the remote end of the cable (not shown).

Once the pin 135 is released from the latch 137, the first link 138 is free to rotate about the back frame pivot 131b and because the linkage pivots 131a, 131b and 133 are not collinear (i.e. their axes of rotation do not lie in the same plane) the linkage 132 tends to collapse. As such, the perch member 100 becomes free to pivot about the joint 120 back to the second position and tends to do so under the weight of the perch member 100 or under the combined weight of the perch member 100 and the occupant.

The arrangement of the perch member 100 and the seat 1 is such that as the perch member 100 rotates from the first condition orientation to the second condition orientation, any occupant sitting on the perch member 100 will drop down to the base member 50 but tend to have the impact of the fall onto the base member mitigated by the suspension system 8.

In operation the base member 50 may be converted from the first condition, or 'sit on' condition, to the second condition, or 'slide down' condition. Further the base member 50 may be converted back from the second condition to the first condition.

In order to convert the base member 50 from the first condition, the first latching bar 51a must be released from the first latching gate 28a. This may be done by pushing the tilt lever 23 forwards causing the lever bar to rotate and thereby pull on cable 29a so as to open the latch.

Upon release of the bar 51a, the base member 50 is free to move as the free link in a four bar linkage (that is to say that neither the base member 50 nor the pivots which connect to it are fixed to one particular location relative to the tray 26). In such a free state, the occupant may manually effect the conversion by pushing generally downwards on the front edge 58*a* of the base member 50. Such pushing tends to rotate the base member 50 about both the pivots 55*a* and 57*a* so as to raise the back end 58*b* of the base member 50 (with respect to the figures, this is an anticlockwise rotation of the base member 50). The rotation of the base member 50 and the associated raising at the back end 58*b* causes the first link to counter rotate (that is to say it rotates in the opposite direction to the base member 50, which is clockwise in the context of the figures). Such counter rotation tends to draw the pivots 55*a* and 55*b* higher and in towards the tray 26. Accordingly the base member 50, which is connected to the pivots 55*a* and 57*a*, is also drawn in towards the tray 26.

As the base member 50 arrives at the second condition, the first latching bar 51*a* engages with the first latching gate 28*a* and becomes trapped therein to secure the base member 50 in this condition. The surface 53 faces forwards.

The difference in forward protrusion, parameter G in the figures, is approximately 200 mm. 200 mm can relate to a significant amount of space in the turret of an armoured vehicle.

In order to convert the base member 50 from the raised condition to the as seat condition, the first latching bar 51*a* must first be released from the first latching gate 28*a*. Such release is done by pushing the tilt lever 23 backwards so that cable 29*a* is pulled to open the gate 28*a*.

Once released, the base member 50 may be pulled forwards and pushed downwards by the occupant. Such manoeuvring of the base member 50 rotates the base member 50 relative to the tray 26 (which rotation is clockwise in the context of the figures) whilst the links 138, 139 counter rotate (which counter rotation is anti-clockwise in the context of the figures). The counter rotation of the links 138, 139 tends to move the base member 50 forwards. Eventually, the rotation and translation of the base member 50 brings the second latching bar 51*b* into engagement with the second latching gate 28*b*.

When the seat 1 is disposed in certain confined volumes such as that denoted as V in FIGS. 17, 18, 19 and 20, the combined operation of the collapsible base member 50, the significantly alterable height of the seat element 2 and the fine height alteration ability of the tray 26, can provide an evacuation route from the confined volume V. In particular this evacuation route leads under the seat 1 and may be of particular benefit when it is not preferable to evacuate the confined volume V through a roof hatch (e.g. because the confined volume V is the turret of an armoured vehicle under hostile gunfire).

As shown in FIGS. 17, 18, 19 and 20, the combination of operations that provides this evacuation route, where initially the seat 1 is configured for seating the occupant within the confined area is as follows: i) the base member 50 is converted from the first condition to the second condition. Such a procedural step will inevitably result in the occupant no longer being seated on the seat 1 and the collapse of the base member 50 provides sufficient space forwards of the seat 1 to allow the seat element 2 to rise to the higher condition without obstruction from the non-sitting occupant. Accordingly, at step ii) the seat element 2 is converted to its higher position, see FIG. 19; and at step iii) the tray 26 is converted to its highest condition, see FIG. 20. A tunnel, provided behind the seat 1, is now accessible by the occupant.

The base member 50 is formed from a layer of high density energy absorbing foam interposed between a top layer of comfort foam (which provides the surface 53) and a bottom structural layer composed of a glass fibre spall liner.

The back member may be formed with a layer of comfort foam facing forwards and mounted on a backing layer made from glass fibre spall liner.

The major load-bearing structural components of the seat are composed from a material having appropriate properties. For example mild steel may be selected for the support, the platform block and the seat element. Where the seat is necessarily lightweight, aluminum, titanium or suitable alloys may be used in place of mild steel. Any combination of these materials may be used as appropriate.

The distance between the first and second position of the secured platform block may vary with the vehicle which the seat is intended for. Where the seat is intended for a turreted armoured vehicle, the first securable position of the platform block may be 200 mm to 500 mm below the second securable position.

The tray may travel between a lower height extremity and an upper height extremity, these extremities being approximately 200 mm apart so that a comprehensive anthropomorphic range of occupants may use the chair comfortably.

The weight opposing resilient members 47 and 25 can be in the form of gas struts.

The resilient member 81 may be in the form of a spring and should be calibrated according to suitable parameters. In particular, variable parameters such as the mass of the vehicle, the impulse from a blast, the pre-explosion loading of the member and the space available within the vehicle should be considered in calibrating the spring alongside parameters such as the limit of survivable human acceleration and the worst case scenario weight of an occupant.

Where the vehicle is estimated as having approximately a 30,000 kg mass and the impulse from the expected blast is approximately 100,000 Ns and the spring is pre-loaded to 3 g, the applicant has calculated that the spring should have a stroke of approximately 90 mm, should be preloaded to apply a force of approximately 4,000 N and should apply a maximum force of approximately 13,000 N.

As an alternative to the cables disclosed above as means for applying actuating forces at positions remote from the actuated components, the skilled man would understand that other forms of actuation would be possible. For example hydraulic actuation systems could be configured for releasing any of the pins and latching bars discussed above from their respective latching mechanisms.

As an alternative to the above configuration of the seat element to support interface where one guide block is provided, the seat element may be provided with a plurality of guide blocks. In connection with this alternative, the support poles may extend downwards to a greater extent and thereby allow space for the provision of a second guide block arranged to travel along the poles and below the platform block. The first and further guide block may each be fixed to the back frame and may be connected to each other.

As an alternative to the above configuration of the support poles, seat element and platform block (where the platform block is interposed between the poles and the pins deploy outwardly), the seat may be provided with a central support member that is surrounded by the platform block with the platform block being configured to promote deployment of the pins inwardly towards the single support member.

A specific example of the invention and various alternatives have been described, but a skilled man would upon reading the present description be enabled to generate further alternative embodiments of the invention without recourse to inventive activity and without departing from the scope of the invention.

The invention claimed is:

1. A seat system for a vehicle, configurable to enable an occupant to be seated either in a lower position or in an upper position, the seat system comprising:
   a vertical support constructed and arranged to be secured in a substantially vertical orientation to a wall of the vehicle;
   a base member to provide a seating surface for accommodating an occupant in the lower position;
   a seat back positioned to extend generally upwards from the base member to support an occupant's back, the seat back being slidable along the vertical support in the vertical direction between the lower position and the upper position;
   a perch member selectively deployable either:
      in a first condition, where the perch member is configured as an extension of the seat back to provide back support for the occupant when in the lower position, or
      in a second condition, where the perch member is configured as an additional base member to provide another seating surface for an occupant when in the upper position;
   a fastener for securing the perch member when in the second condition; and
   a linkage extending between the seat back and a point on the perch member substantially towards a lowermost end of the perch member, the linkage being arranged to lock when the perch member is configured into the second condition such that the linkage acts as a strut supporting weight of an occupant.

2. A seat system according to claim 1, comprising:
   a pivot joint, connecting the perch member to the seat back, and being for supporting the perch member and for guiding the perch member.

3. A seat system according to claim 2, wherein the pivot joint connects the perch member to the seat back along an axis that is positioned substantially at an uppermost portion of the perch member when configured in the first condition.

4. A seat system according to claim 3, wherein the perch member comprises:
   an occupant accommodating face, and the pivot joint is configured such that when the perch member is in the first condition, the face may accommodate a back of an occupant, and when the perch member is in the second condition the face may accommodate an occupant in the upper position.

5. A seat system according to claim 2, wherein the perch member comprises:
   an occupant accommodating face, and the pivot joint is configured such that when the perch member is in the first condition, the face may accommodate a back of an occupant, and when the perch member is in the second condition the face may accommodate an occupant in the upper position.

6. A seat system according to claim 5, wherein the pivot joint connects the perch member to the seat back along an axis that is positioned substantially at an uppermost portion of the occupant accommodating face when configured in the first condition.

7. A seat system according to claim 1, wherein the fastener comprises:
   a latch mechanism formed by a pin on the linkage and a gate at the seat back, such that as the perch member is configured for the second condition, the pin engages the gate and is locked in place.

8. A seat system according to claim 1, further comprising:
   a switch, readily accessible by an occupant when in the upper position, the switch communicating with the perch member such that upon actuation of the switch the perch member ceases to be secured by the fastener.

9. A seat system according to claim 1, further comprising:
   a second fastener for securing the perch member in the first condition.

10. A seat system according to claim 9, wherein the seat comprises:
    a linkage, and the second fastener is formed by a pivoted cam connected to the perch such that if the pivoted cam is held in a forward position then the cam obstructs the linkage and prevents deployment of the perch member into second condition, and if the pivoted cam is held in a backwards position then the linkage is free to extend and deploy the perch.

11. A seat system according to claim 10, wherein the pivoted cam is pivoted about a same axis as the pivot joint, but pivots independently.

12. A seat system for a vehicle, configurable to enable an occupant to be seated either in a lower position or in an upper position, the seat system comprising:
    a vertical support constructed and arranged to be secured in a substantially vertical orientation to a wall of the vehicle;
    a base member to provide a seating surface for accommodating an occupant in the lower position;
    a seat back positioned to extend generally upwards from the base member to support an occupant's back;
    a perch member selectively deployable either:
       in a first condition, where the perch member is configured as an extension of the seat back to provide back support for the occupant when in the lower position, or
       in a second condition, where the perch member is configured as an additional base member to provide another seating surface for an occupant when in the upper position; and
    a first fastener for securing the perch member in the second condition; and
    a second fastener for securing the perch member in the first condition; and
    a linkage, and the second fastener is formed by a pivoted cam connected to the perch such that if the pivoted cam is held in a forward position then the cam obstructs the linkage and prevents deployment of the perch member into the second condition, and if the pivoted cam is held in a backwards position then the linkage is free to extend and deploy the perch.

13. A seat system according to claim 12, wherein the pivoted cam is pivoted about a same axis as the pivot joint, but pivots independently.

14. A seat system according to claim 12, comprising:
    a pivot joint, connecting the perch member to the seat back, and being for supporting the perch member and for guiding the perch member.

15. A seat system according to claim 14, wherein the pivot joint connects the perch member to the seat back along an axis that is positioned substantially at an uppermost portion of the perch member when configured in the first condition.

16. A seat system according to claim 14, wherein the perch member comprises:
    an occupant accommodating face, and the pivot joint is configured such that when the perch member is in the first condition, the face may accommodate a back of an occupant, and when the perch member is in the second condition the face may accommodate an occupant in the upper position.

17. A seat system according to claim 16, wherein the pivot joint connects the perch member to the seat back along an axis that is positioned substantially at an uppermost portion of the occupant accommodating face when configured in the first condition.

18. A seat system according to claim 12, wherein the seat comprises:
    a linkage extending between the seat back and a point on the perch member substantially towards a lowermost end of the perch member, the linkage being arranged to lock when the perch member is configured into the second condition such that the linkage acts as a strut supporting weight of an occupant.

19. A seat system according to claim 12, wherein the fastener comprises:
    a latch mechanism formed by a pin on the linkage and a gate at the seat back, such that as the perch member is configured for the second condition, the pin engages the gate and is locked in place.

20. A seat system according to claim 12, further comprising:
    a switch, readily accessible by an occupant when in the upper position, the switch communicating with the perch member such that upon actuation of the switch the perch member ceases to be secured by the fastener.

21. A seat system for a vehicle, configurable to enable an occupant to be seated either in a lower position or in an upper position, the seat system comprising:
    a vertical support constructed and arranged to be secured in a substantially vertical orientation to a wall of the vehicle;
    a base member to provide a seating surface for accommodating an occupant in the lower position;
    a seat back positioned to extend generally upwards from the base member to support an occupant's back, the seat back being slidable along the vertical support in the vertical direction between the lower position and the upper position;
    a perch member selectively deployable either:
        in a first condition, where the perch member is configured as an extension of the seat back to provide back support for the occupant when in the lower position, or
        in a second condition, where the perch member is configured as an additional base member to provide another seating surface for an occupant when in the upper position; and
    a fastener for securing the perch member when in the second condition;
    a switch, readily accessible by an occupant when in the upper position, the switch communicating with the perch member such that upon actuation of the switch the perch member ceases to be secured by the fastener.

22. A seat system according to claim 21, comprising:
    a pivot joint, connecting the perch member to the seat back, and being for supporting the perch member and for guiding the perch member.

23. A seat system according to claim 22, wherein the pivot joint connects the perch member to the seat back along an axis that is positioned substantially at an uppermost portion of the perch member when configured in the first condition.

24. A seat system according to claim 22, wherein the perch member comprises:
    an occupant accommodating face, and the pivot joint is configured such that when the perch member is in the first condition, the face may accommodate a back of an occupant, and when the perch member is in the second condition the face may accommodate an occupant in the upper position.

25. A seat system according to claim 24, wherein the pivot joint connects the perch member to the seat back along an axis that is positioned substantially at an uppermost portion of the occupant accommodating face when configured in the first condition.

26. A seat system according to claim 21, wherein the seat comprises:
    a linkage extending between the seat back and a point on the perch member substantially towards a lowermost end of the perch member, the linkage being arranged to lock when the perch member is configured into the second condition such that the linkage acts as a strut supporting weight of an occupant.

27. A seat system according to claim 26, wherein the fastener comprises:
    a latch mechanism formed by a pin on the linkage and a gate at the seat back, such that as the perch member is configured for the second condition, the pin engages the gate and is locked in place.

28. A seat system according to claim 21, further comprising:
    a second fastener for securing the perch member in the first condition.

29. A seat system according to claim 28, wherein the seat comprises:
    a linkage, and the second fastener is formed by a pivoted cam connected to the perch such that if the pivoted cam is held in a forward position then the cam obstructs the linkage and prevents deployment of the perch member into second condition, and if the pivoted cam is held in a backwards position then the linkage is free to extend and deploy the perch.

30. A seat system according to claim 29, wherein the pivoted cam is pivoted about a same axis as the pivot joint, but pivots independently.

* * * * *